United States Patent
Okamoto et al.

(10) Patent No.: US 6,911,997 B1
(45) Date of Patent: Jun. 28, 2005

(54) MONITORING SYSTEM, CAMERA ADJUSTING METHOD AND VEHICLE MONITORING SYSTEM

(75) Inventors: Shusaku Okamoto, Osaka (JP); Masamichi Nakagawa, Osaka (JP); Atsushi Morimura, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 683 days.

(21) Appl. No.: 09/807,333

(22) PCT Filed: Oct. 12, 2000

(86) PCT No.: PCT/JP00/07062

§ 371 (c)(1),
(2), (4) Date: Apr. 11, 2001

(87) PCT Pub. No.: WO01/28250

PCT Pub. Date: Apr. 19, 2001

(30) Foreign Application Priority Data

Oct. 12, 1999 (JP) .................................. 11-289529

(51) Int. Cl.$^7$ .............................................. H04N 7/18
(52) U.S. Cl. .................. 348/148; 348/169; 382/103
(58) Field of Search ............................... 348/148, 159, 348/169, 174, 119; 340/937, 461; 359/753; 382/103, 104, 105

(56) References Cited

U.S. PATENT DOCUMENTS

| | | | |
|---|---|---|---|
| 4,566,032 A | * | 1/1986 | Hirooka et al. ............. 348/119 |
| 5,414,461 A | | 5/1995 | Kishi et al. |
| 5,680,123 A | * | 10/1997 | Lee ............................ 340/937 |
| 5,729,216 A | * | 3/1998 | Sasaki et al. ............... 340/937 |
| 5,949,331 A | | 9/1999 | Schofield et al. |
| 6,333,759 B1 | * | 12/2001 | Mazzilli ..................... 348/148 |
| 6,476,855 B1 | * | 11/2002 | Yamamoto ................. 348/148 |
| 6,590,719 B2 | * | 7/2003 | Bos ............................ 359/753 |
| 6,611,202 B2 | * | 8/2003 | Schofield et al. .......... 340/461 |

FOREIGN PATENT DOCUMENTS

| | | |
|---|---|---|
| DE | 198 16 054 A1 | 10/1998 |
| JP | 58110334 A | 6/1983 |
| JP | 60-047572 A | 3/1985 |
| JP | 63-291747 A | 11/1988 |
| JP | 02-144239 A | 6/1990 |

(Continued)

OTHER PUBLICATIONS

International Search Report for International Application No. PCT/JP00/07062; Mailed Jan. 16, 2001; ISA JPO.

*Primary Examiner*—Gims Philippe
(74) *Attorney, Agent, or Firm*—Harness, Dickey & Pierce, P.L.C.

(57) ABSTRACT

To monitor both the surrounding of a vehicle and a place distant therefrom, there is mounted on the vehicle a twin-camera (23) composed of cameras (23L, 23R) forming a pair. To properly set the postures of the cameras (23L, 23R), their tilts, pans and twists around the optical axes are adjusted using, as indexes, the lengths of the portions, as captured by the cameras (23L, 23R), of the vehicle center line (BCL), the lengths of the portions, as captured by the cameras (23L, 23R), of the vehicle rear-end line (BEL), and the areas of the blind zones (S) in the capturing directions.

10 Claims, 27 Drawing Sheets

FOREIGN PATENT DOCUMENTS

| | | |
|---|---|---|
| JP | 03-099952 | 4/1991 |
| JP | 04-050041 A | 2/1992 |
| JP | 08-018876 A | 1/1996 |
| JP | 08048198 A | 2/1996 |
| JP | 08-150875 A | 6/1996 |
| JP | 08-214213 A | 8/1996 |
| JP | 09-052555 A | 2/1997 |
| JP | 09-323590 A | 12/1997 |
| JP | 10059068 A | 3/1998 |
| JP | 10-117343 A | 5/1998 |

* cited by examiner

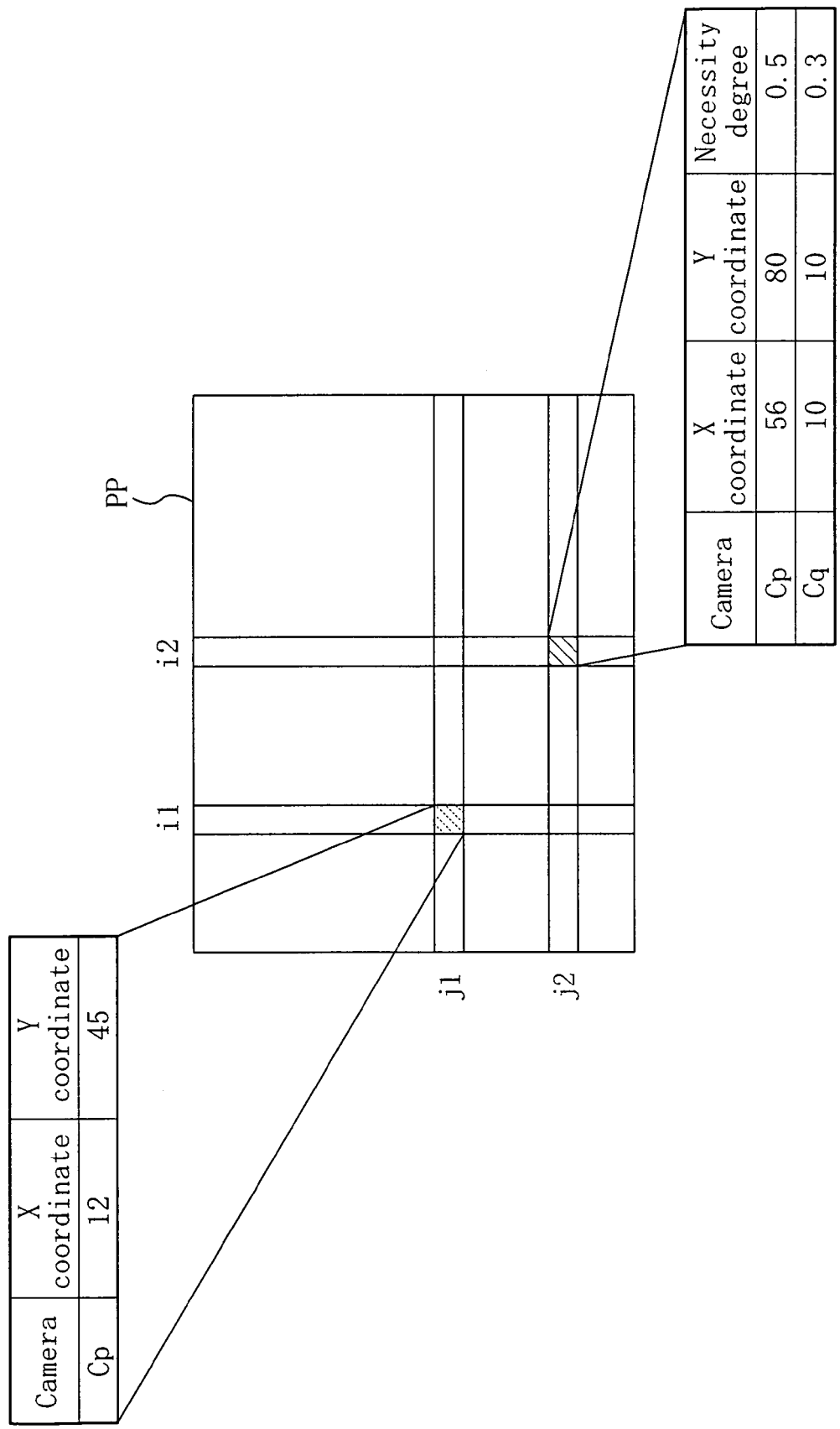

FIG. 6A  Setting of the tilt of the camera  ⊗ ··· from the front to the inner part
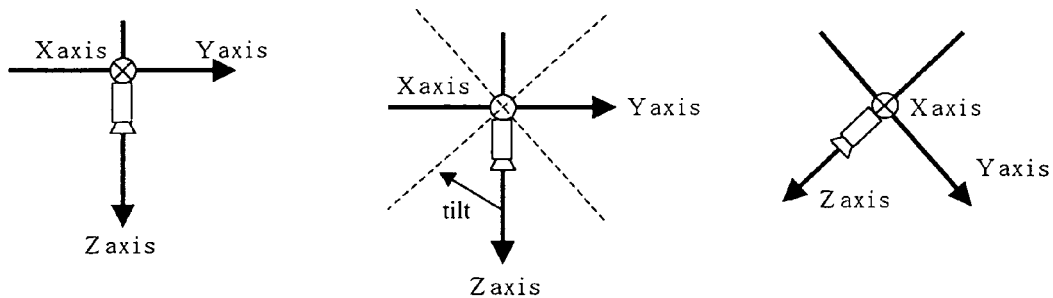
FIG. 6B  Setting of the pan of the camera
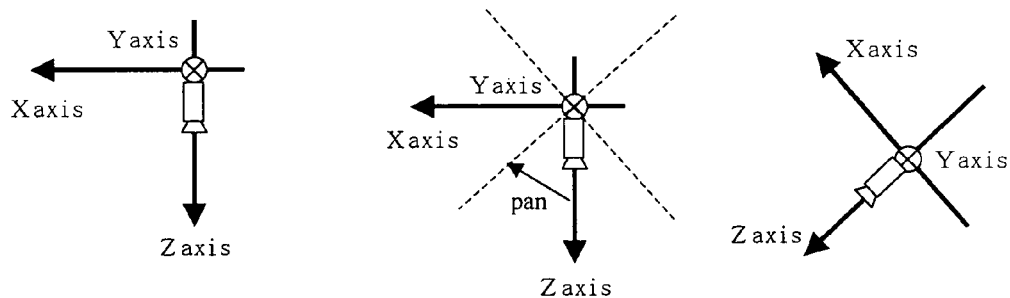
FIG. 6C  Setting of the twist around the optical axis of the camera
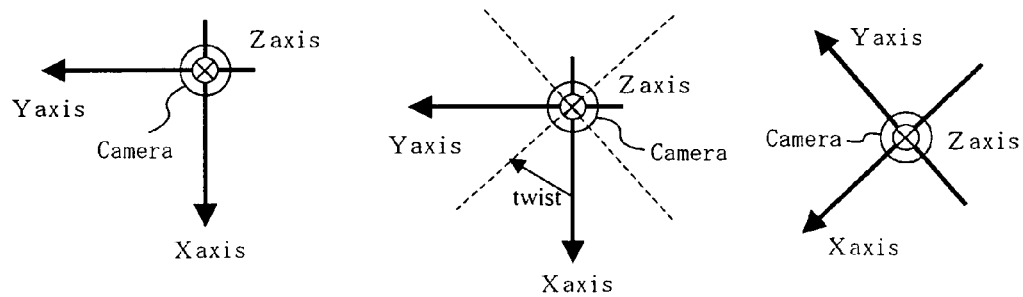

tilt:37.5° tilt:42.5° tilt:47.5°

FIG. 11A  twist:0°
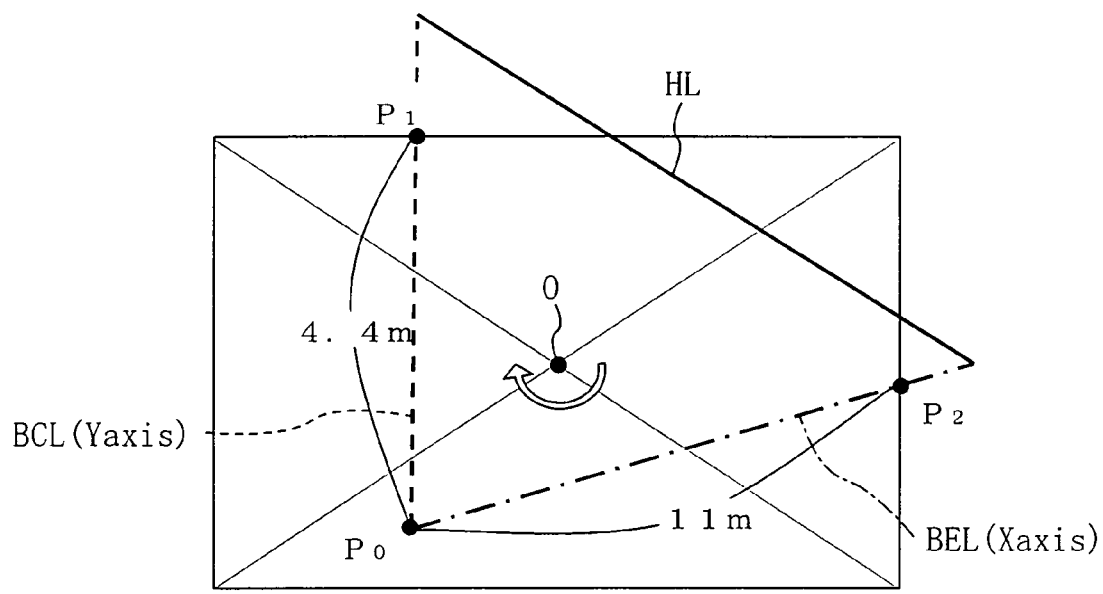
twist 33.2°
FIG. 11B  twist:33.2°
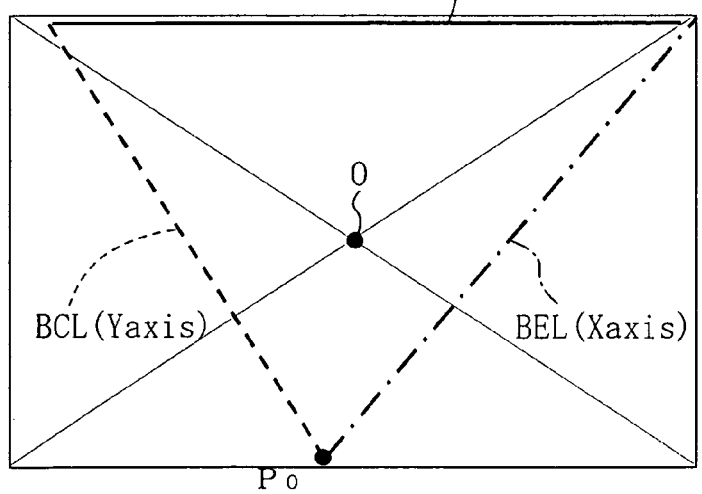

FIG. 12A  twist:0°
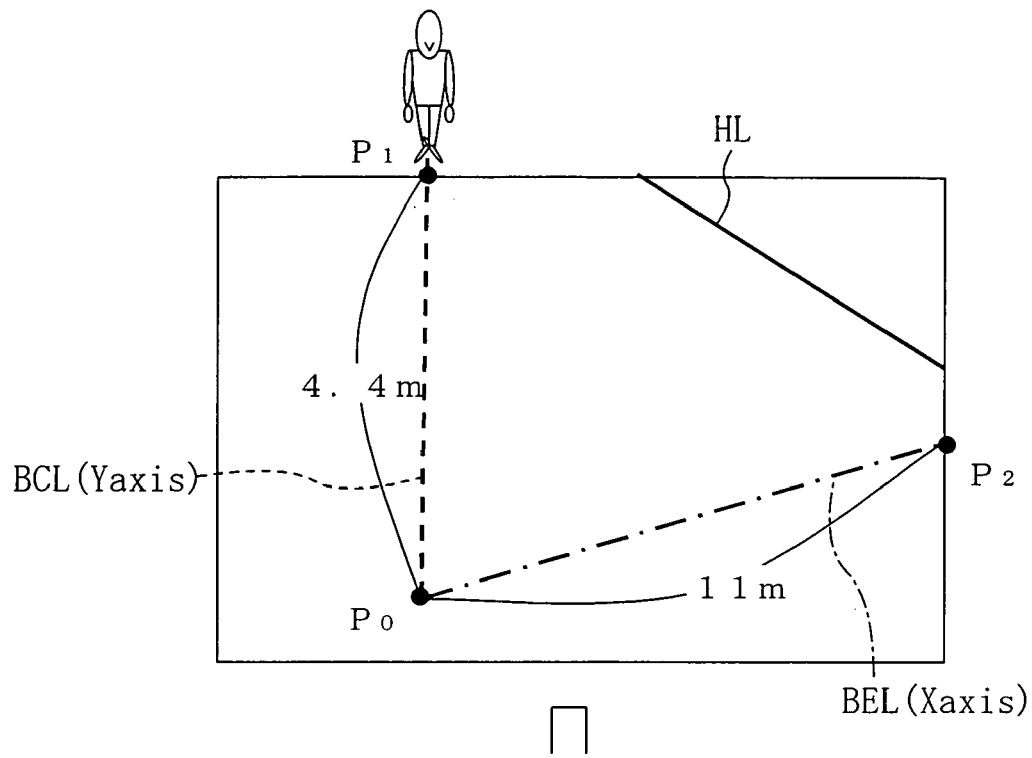
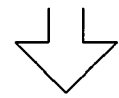
Conversion of the virtual visual point image
(viewed from above)
FIG. 12B
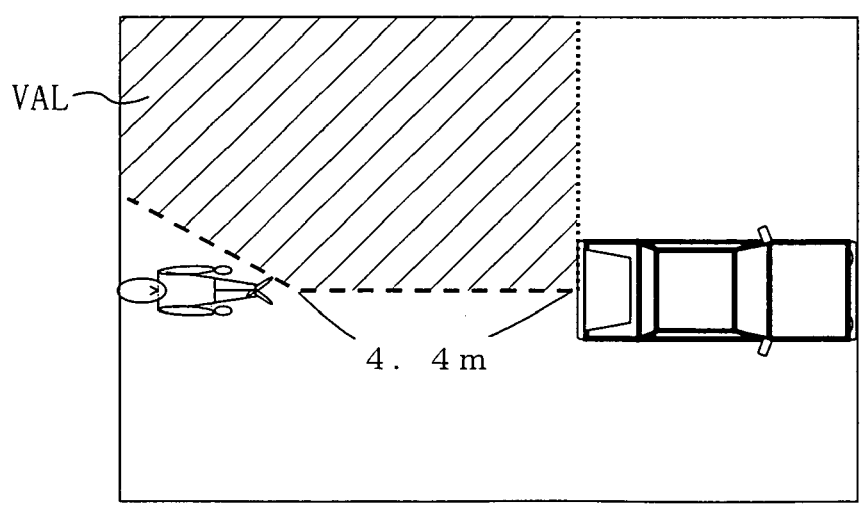

FIG. 13A  twist:33.2°
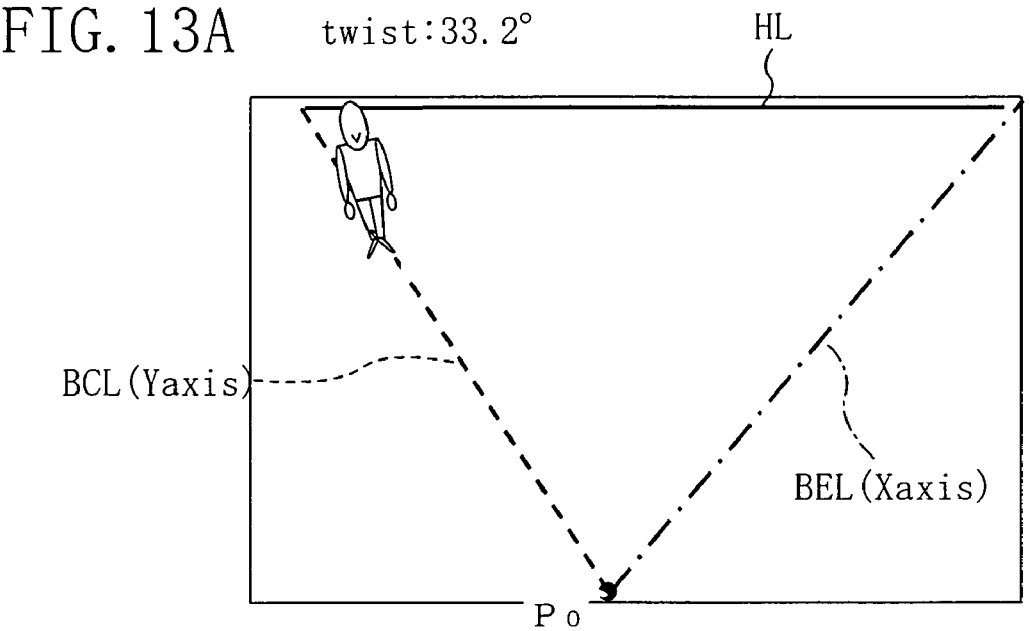
Conversion of the virtual visual point image
(viewed from above)
FIG. 13B
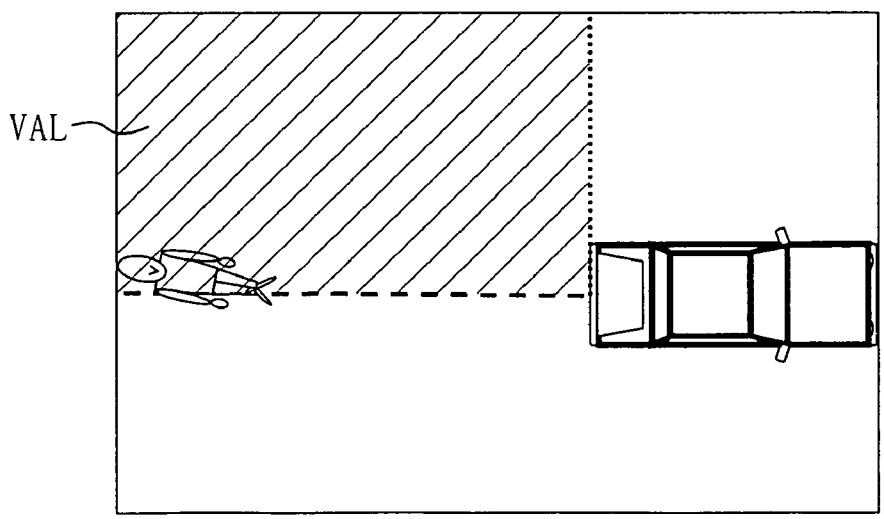

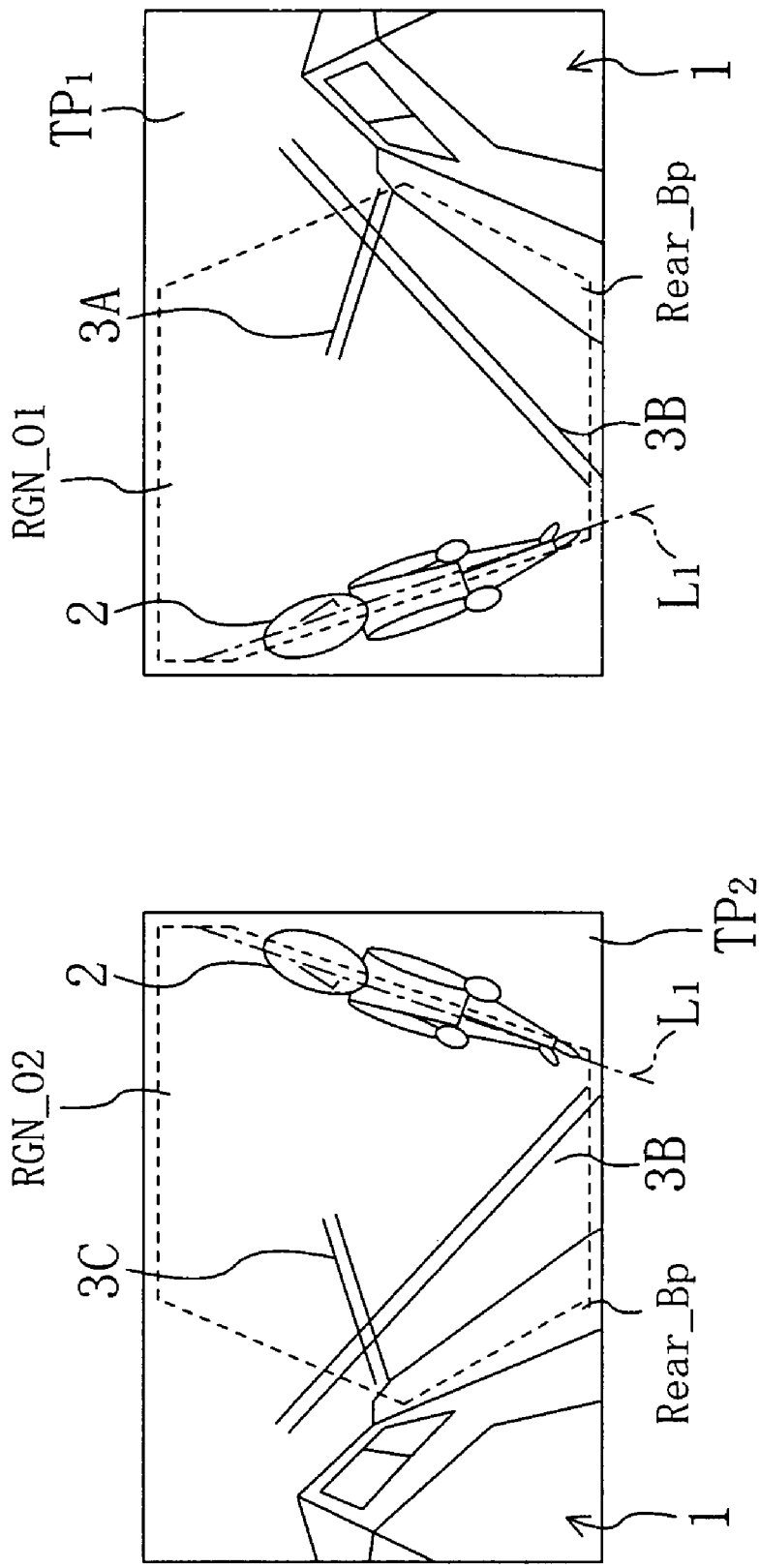

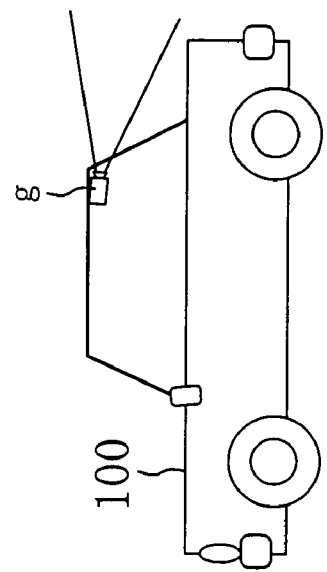
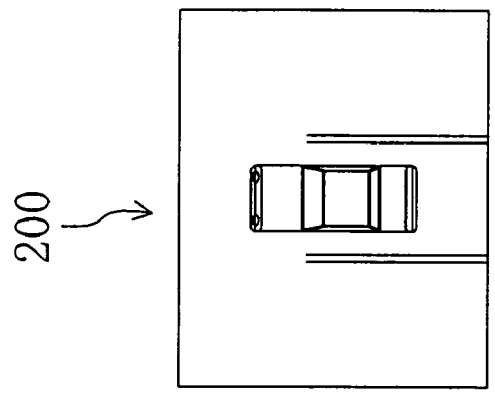
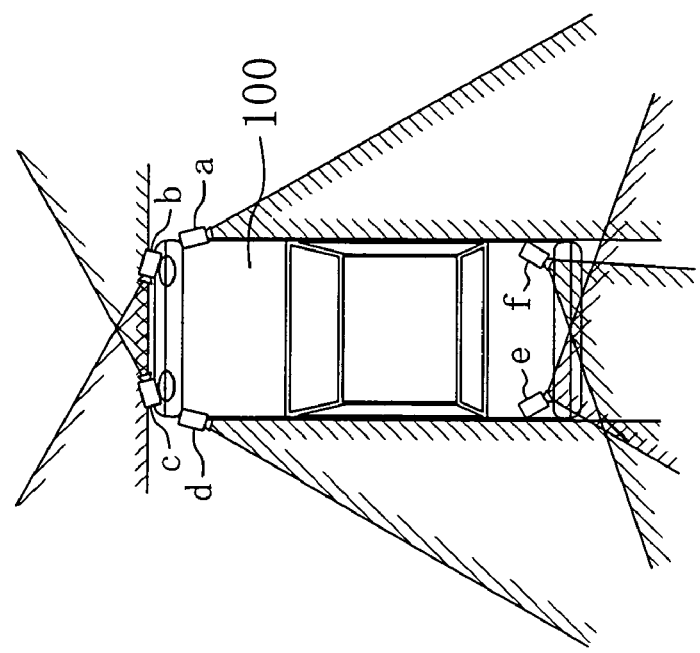

MONITORING SYSTEM, CAMERA ADJUSTING METHOD AND VEHICLE MONITORING SYSTEM

TECHNICAL FIELD

The present invention relates to technique effective for a monitoring system using a camera, which technique is utilized as an aide of making sure of the safety, or the like when driving a vehicle.

BACKGROUND ART

There is conventionally known, as apparatus for actually capturing and monitoring the surrounding of a vehicle with the use of a camera, apparatus set forth in Japanese Patent Laid-Open Publication No. H3-99952. As shown in FIG. 29(a), this apparatus (vehicle surrounding situation monitor) is provided at the surrounding of a vehicle 100 with a plurality of vehicle surrounding situation monitoring cameras (a~f). This apparatus is arranged such that partial images captured by the respective cameras are converted in plan elevation to form partial images in plan elevation, and that these partial images are synthesized to form a whole image in plan elevation as shown in FIG. 29(b), and that this whole image is displayed on a display (TV monitor) 200.

In the apparatus above-mentioned, however, the road monitoring cameras are not so arranged as to display even a rear scene. Accordingly, when intended to display a rear scene on the display at the time of backing operation, it is required to additionally dispose a rear monitoring camera g on the vehicle 100, in addition to the road capturing cameras above-mentioned.

DISCLOSURE OF INVENTION

It is an object of the present invention to provide a monitoring system used for a vehicle or the like, which is improved in camera mounting posture and position, thereby to improve the monitoring performance as compared with a conventional monitoring system.

More specifically, the present invention provides a monitoring system comprising a twin-camera composed of first and second cameras forming a pair, the first and second cameras being disposed such that at least portions of the ranges to be captured thereby overlap each other, and that the optical axes thereof form a predetermined angle of divergence when the optical axes are projected on a camera installation plane parallel to the optical axes, and the twist around the optical axis of at least one of the first and second cameras being set such that when a u-v plane of the visual field range of the at least one camera is projected on a reference plane at a right angle to the optical axis of the at least one camera, the u axis is not parallel to and does not intersect, at a right angle, the intersecting line of the reference plane and the camera installation plane.

The twin-camera is preferably mounted on a vehicle for capturing both the surrounding of the vehicle and a place distant therefrom. Further, the twin-camera is preferably disposed such that the angle of divergence is not less than 50° and not greater than 90°, and that the twist is not less than 10° and not greater than 35° on the assumption that the twist is 0° when the u axis on the reference plane is parallel to the intersecting line of the reference plane and the camera installation plane.

Preferably, each of the first and second cameras has a visual field range in the form of a square.

The present invention provides a method of adjusting a twin-camera composed of a pair of cameras mounted on a vehicle for capturing both the surrounding of the vehicle and a place distant therefrom, this camera adjusting method being characterized in that the tilt, pan and twist around the optical axis of each of the pair of cameras, are adjusted using, as indexes, the length of a portion, as captured by each camera, of the straight line indicating the capturing direction, the length of a portion, as captured by each camera, of a straight line extending along the vehicle end, and the area of the blind zone in the capturing direction.

The present invention provides a vehicle monitoring system comprising: a plurality of cameras for capturing the surrounding of a vehicle; and an image processing unit for generating, from the images captured by the plurality of cameras, a synthesized image viewed from a virtual view point, the plurality of cameras comprising a twin-camera composed of two cameras which form a pair and which are disposed in the close vicinity to each other.

The twin-camera is preferably mounted in a unitary structure.

The present invention provides a vehicle monitoring system comprising: one or a plurality of cameras for capturing the surrounding of a vehicle; and an image processing unit for generating, from the images captured by the one or plurality of cameras, a synthesized image viewed from a virtual view point, at least one of the one or plurality of cameras being mounted on the vehicle at its lateral side, a non-movable part of its door mirror, its window visor or its door knob mounting part.

The present invention provides a vehicle monitoring system comprising: one or a plurality of cameras for capturing the surrounding of a vehicle; and an image processing unit for generating, from the images captured by the one or plurality of cameras, a synthesized image viewed from a virtual view point, at least one of the one or plurality of cameras being disposed as corresponding to illumination means for irradiating light to the range to be captured by the at least one camera.

The present invention provides a vehicle monitoring system comprising: one or a plurality of cameras for capturing the surrounding of a vehicle; and an image processing unit for generating, from the images captured by the one or plurality of cameras, a synthesized image viewed from a virtual view point, at least one of the one or plurality of cameras being so retractably mounted on the vehicle as to be ejected when the camera is used, and as to be housed when the camera is not used.

The retractable camera is preferably arranged such that its ejecting and housing is controlled according to at least one of the gear setting or travelling speed of the vehicle.

The present invention provides a vehicle monitoring system comprising: one or a plurality of cameras for capturing the surrounding of a vehicle; and an image processing unit for generating, from the images captured by the one or plurality of cameras, a synthesized image viewed from a virtual view point, at least one of the one or plurality of cameras being mounted on the vehicle together with an openable member disposed at the front in the capturing direction of the at least one camera, the openable member being so controlled as to be opened when the camera is used, and as to be closed when the camera is not used.

BRIEF DESCRIPTION OF DRAWINGS

FIG. 2 is a view for illustrating a conversion table used in each of the vehicle monitoring systems in FIG. 1;

FIG. 6(a) to FIG. 6(c) are views illustrating the rotating operations to be conducted for determining the tilt, pan and twist representing the camera direction;

FIG. 11(a) and FIG. 11(b) are conceptual views illustrating how the visual field range is changed according to the rotation of the camera around its optical axis;

FIG. 12(a) and FIG. 12(b) are views illustrating virtual visual point images obtained at the time when the twist is 0° as shown in FIG. 11(a);

FIG. 13(a) and FIG. 13(b) are views illustrating virtual visual point images obtained at the time when the twist is 33.2° as shown in FIG. 11(b);

Each of FIG. 14(a)

FIG. 15(a) and FIG. 15(b) are views of a vehicle and its surrounding for illustrating second and third embodiments of the present invention, in which FIG. 15(a) is a plan view and FIG. 15(b) is a side view;

FIG. 16(a) and FIG. 16(b) are views illustrating images captured by the respective cameras shown in FIG. 15;

FIG. 29(a) to FIG. 29(c) are views for illustrating technique of prior art.

BEST MODE FOR CARRYING OUT THE INVENTION

The following description will discuss embodiments of the present invention with reference to the attached drawings.

Figure 1A:
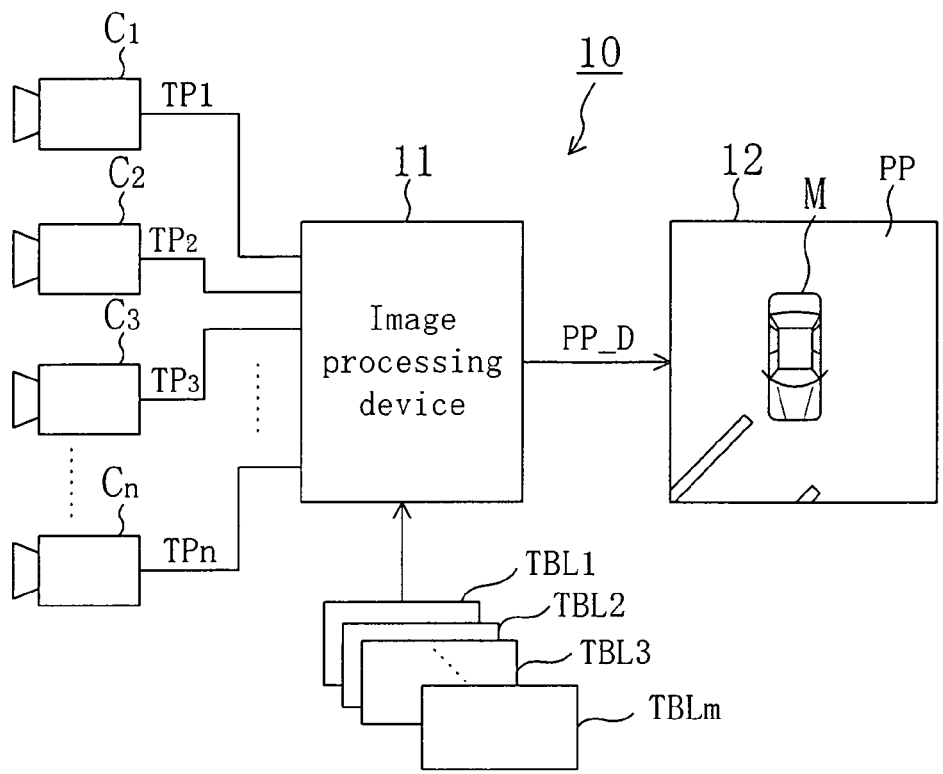
FIG. 1(a) and FIG. 1(b) are views respectively illustrating the arrangements of vehicle monitoring systems according to embodiments of the present invention.
Figure 1B:
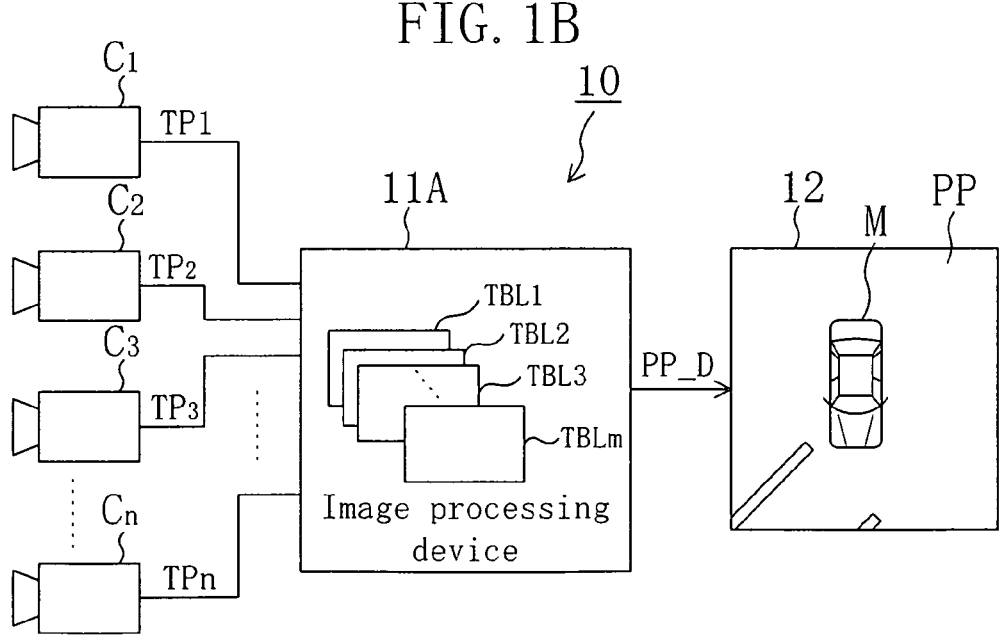

FIG. 1(a) and FIG. 1(b) are functional block diagrams of vehicle outside display apparatus, serving as vehicle monitoring systems, according to embodiments of the present invention. In FIG. 1(a), the vehicle outside display apparatus 10 comprises: a plurality of color CCD cameras C1~Cn serving as capturing means to be mounted on a plurality of positions of a vehicle; an image processing device 11 which receives captured images TP1~TPn from the cameras C1~Cn, and which processes and supplies these captured images TP1~TPn as virtual visual point image data PP_D; and a liquid-crystal display 12 which receives the data PP_D and displays a virtual visual point image PP. The image processing device 11 executes processings on the captured images TP1~TPn with the use of any of conversion tables TBL1~TBLm.

Typically, the capturing means is a color or monochrome digital camera having a solid-state pickup element such as a CCD, CMOS device or the like. The capturing means may be formed for example by a combination of a lens and a prism or a mirror, and may be arranged such that light incident upon the lens, the prism or the mirror passes through a predetermined optical passage and is transmitted to a pickup element disposed at a position remote from the capturing means.

The camera may have two or more mounting postures (such that the camera direction can be changed), or may be arranged such that the range to be captured is changed by a zooming operation or the like. It is a matter of fact that when the camera is changed in mounting posture and the range to be captured, the image processing device 11 suitably executes a different processing.

The image processing device 11 may be mounted on the vehicle or may be disposed at a place other than the vehicle. In the latter case, the image data from the capturing means are transmitted in a wireless manner to an image processing device outside of the vehicle, and this image processing device executes a predetermined processing on the received image data to form a virtual visual point image, and sends this virtual visual point image thus formed to the display mounted on the vehicle.

Typically, the display is a liquid-crystal display, but may be other display device such as a plasma display or the like. The display may also serve as a vehicle-mounted GPS terminal display (a display of a so-called car navigation system), or may be disposed independently therefrom.

The display mode of the vehicle outside display apparatus 10, is determined according to the conversion table used by the image processing device 11. The display mode may be switched manually or automatically. Examples of the processing to be executed by the image processing device 11, include 1 a clipping processing, 2 an image deforming processing, and 3 a processing of synthesizing the clipped partial images (including a boundary processing).

The term "clipping" means cutting, from the captured image, a part required for synthesizing a virtual visual point image. The term "boundary processing" means a processing of hiding the boundary between adjacent partial images or a processing of causing the boundary between adjacent partial images to be not noticeable. More specifically, to hide or cause the boundary between adjacent partial images to be not noticeable, the adjacent partial images may be, for example, partially put one upon another at the boundary portions thereof, and there may be used a method of smoothing the change in at least one of brightness, chroma and hue of the overlapping portions at the boundary. It is a matter of course that the boundary between adjacent partial images may be marked clearly by a division line.

These processings 1~3 may be executed respectively individually, or the whole or a portion of these processings 1~3 may be executed at one step. The clipping and synthesizing processings may be executed after the deforming processing has been executed on the captured images, or the deforming and synthesizing processings may be executed after the clipping processing has been executed. For example, when the pickup element is a CCD, the clipping processing can be executed after the captured image has been taken into a frame buffer. When the pickup element is a CMOS device, a portion to be clipped can be designated at the time of capturing, and the clipped image can be taken into the frame buffer.

The display 12 displays a vehicle figure M formed by computer graphics. This vehicle figure M represents a vehicle image viewed from the virtual visual point. However, the display 12 does not always display the vehicle figure M viewed from the virtual visual point.

FIG. 2 is a view illustrating an example of the conversion table. FIG. 2 shows the relationships between the pixel coordinates (i, j) of the virtual visual point image PP and the mapping data.

More specifically, the conversion table is used for converting the pixel coordinates of a partial image into the pixel coordinates of the virtual visual point image. Dependent on the position of the virtual visual point, the camera mounting position and the like, the pixel coordinates of a partial image correspond to the pixel coordinates of the virtual visual point image on the basis of 1:1 or a plural number:1. For example, when the boundary processing is executed on the boundary between partial images, the pixel coordinates of a partial image do not always correspond to the pixel coordinates of the virtual visual point image on the basis of 1:1.

In FIG. 2, the coordinates (i1, j1) represent the pixel to which the partial image captured by a camera Cp (p is any of 1~n) corresponds, and there are prepared, as the mapping data corresponding to this pixel, the XY coordinates in the partial image captured by the camera Cp. The coordinates (i2, j2) represent the pixel which is equivalent to the boundary at which the partial image captured by the camera Cp overlaps the partial image captured by a camera Cq (q is any of 1~n except p), and there are prepared, as the mapping data, the XY coordinates and the necessity degree of the partial images captured by the cameras Cp and Cq. In such a case, the pixel value of the coordinates (i2, j2) can be expressed for example in the following manner:

Pixel value={(pixel value of the coordinates (56, 80) of the camera Cp)×0.5+(pixel value of the coordinates (10, 10) of the camera Cq)×0.3}/(0.5+0.3)

FIG. 1(*b*) shows the arrangement in which the conversion tables TBL1~TBLm are disposed in an image processing device 11A. A processor (not shown) in the image processing device 11A refers to any of the conversion tables TBL1~TBLm.

More specifically, the conversion tables TBL1~TBLm shown in FIG. 1 are being written in a ROM (including a writing and erasable ROM such as an EEPROM or the like) or a RAM. The conversion tables may be generated by a processor in the image processing device 11 which calculates conversion table data and writes the data thus calculated in the RAM or ROM. Alternatively, the conversion tables may be generated by writing the conversion table data supplied as firmware in the RAM or ROM with the use of data transmission means such as a communication circuit, a disk drive or the like.

As to each of the images captured by the cameras C1~Cn, it is possible to previously set the range to be clipped and to previously determine this range to be clipped based on the clipping reference point.

The function of the image processing device may wholly or partially be achieved with the use of a dedicated hardware or software. It is also possible to utilize a recording medium or transmission medium which stores a program for causing the computer to execute the whole or partial function of the image processing device.

The following description will discuss embodiments of the present invention. For convenience's sake, each camera, the human body and the like are shown in illustration although these should originally be shown in photograph.

FIRST EMBODIMENT

Figure 3:
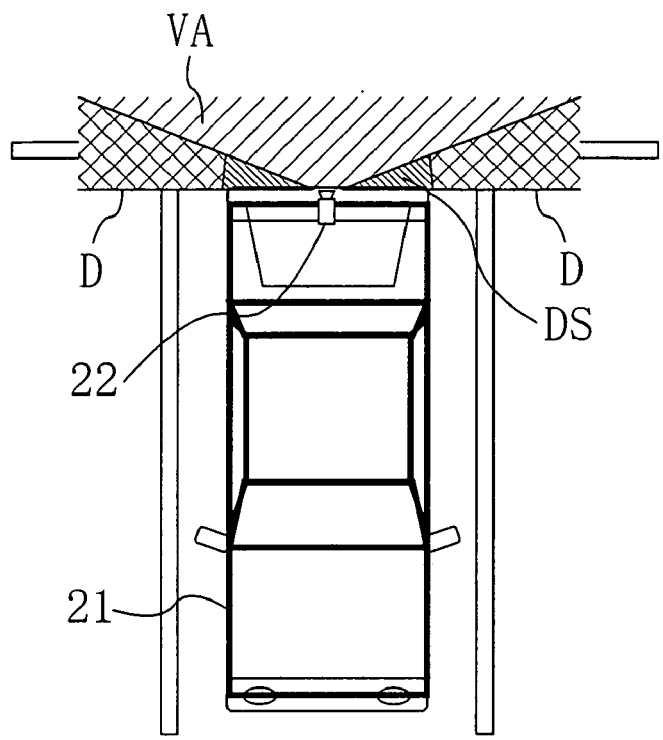
FIG. 3 is a view illustrating how a rear monitoring camera is mounted in prior art.

FIG. 3 is a view illustrating how a rear monitoring camera is mounted in prior art. To monitor in more detail the vehicle in the rear direction, it is desired to capture a range as broad as possible from the vicinity just behind the vehicle to a place distant therefrom. In this connection, a camera having a very wide visual field of which field of view exceeds 110°, is recently increasingly used as capturing means for monitoring the vehicle in the rear direction. As shown in FIG. 3, however, even with a wide-angle camera, blind zones D deviating from the range to be captured are inevitably generated at both sides just behind a vehicle 21 as far as the field of view of the camera is smaller than 180°. Particularly, when those portions DS of the blind zones D located at inner parts with respect to the vehicle width, cannot be seen, an object present in the portions DS cannot be recognized on the captured image. This introduces the danger of causing trouble in view of safety when the vehicle travels in the backward.

To solve the problem above-mentioned, there is generally proposed a method of using, as the capturing means, a camera using a lens, for example a fisheye lens, having an ultra wide visual field of 180° or more. However, this method is disadvantageous in that the cost is increased because the precision required for lens machining is very high, and that a fine resolution cannot be obtained because the range to be captured is too wide. Thus, this method is encountered by many problems before being put into practical use. Accordingly, as compared with the use of an ultra-wide visual field camera, it is considered more effective in view of cost and resolution to use a pair of two cameras in order to obtain a visual field of 180° in the left and right directions.

Figure 4:
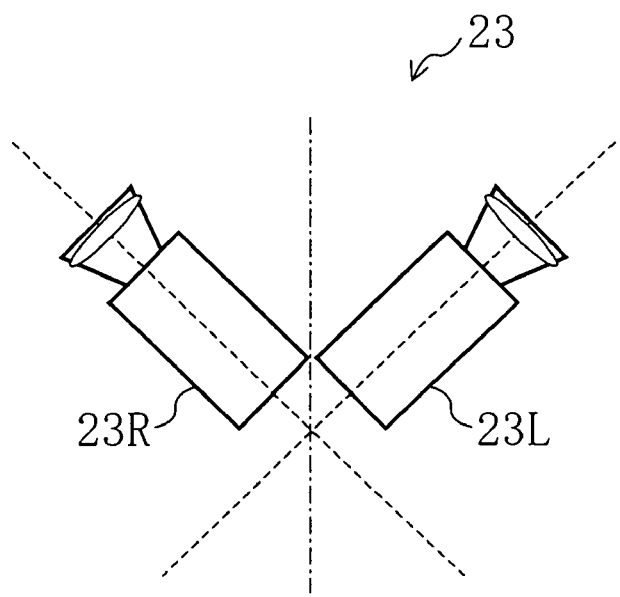
FIG. 4 is a view illustrating how a twin-camera according to a first embodiment of the present invention is mounted.

FIG. 4 is a conceptual view illustrating a mode of mounting, as a pair, two cameras 23L, 23R in close vicinity to each other. FIG. 4 shows an example of arrangement in which the two cameras 23L, 23R serving as a twin-camera 23 are disposed such that a visual field of 180° is obtained, that the two cameras 23L, 23R are as close to each other as possible, and that the optical axes thereof intersect each other. In this specification, the term "twin-camera" means a pair of two cameras disposed in close vicinity to each other.

When mounting, on a vehicle, the cameras having the arrangement above-mentioned, it is very important in which directions the cameras forming a pair are disposed.

When only one camera is mounted as a rearward monitoring capturing means as conventionally done, the camera can be situated substantially in the optimum position by a simple method of first turning the camera just in the rear direction of the vehicle and adjusting the tilt thereof according to the application. More specifically, when a single camera is used, the adjustment is simple because it is enough to determine only the tilt of the camera.

In a twin-camera, the adjustment of the cameras forming the twin-camera is complicated as compared with a single camera. More specifically, it is not required to independently adjust the postures of the respective cameras forming the twin-camera, but it is required to adjust the optimum postures of the respective cameras while making sure of both the range to be captured by one camera and the range to be captured by the other camera. Making sure of the ranges to be captured by the two cameras, means, for example, making sure that the range to be captured by one camera does not overlap too much the range to be captured by the other camera, and making sure that there is no place which is not captured by either camera.

This embodiment discloses a method of setting the postures of the respective cameras forming the twin-camera as shown in FIG. 4.

Figure 5:
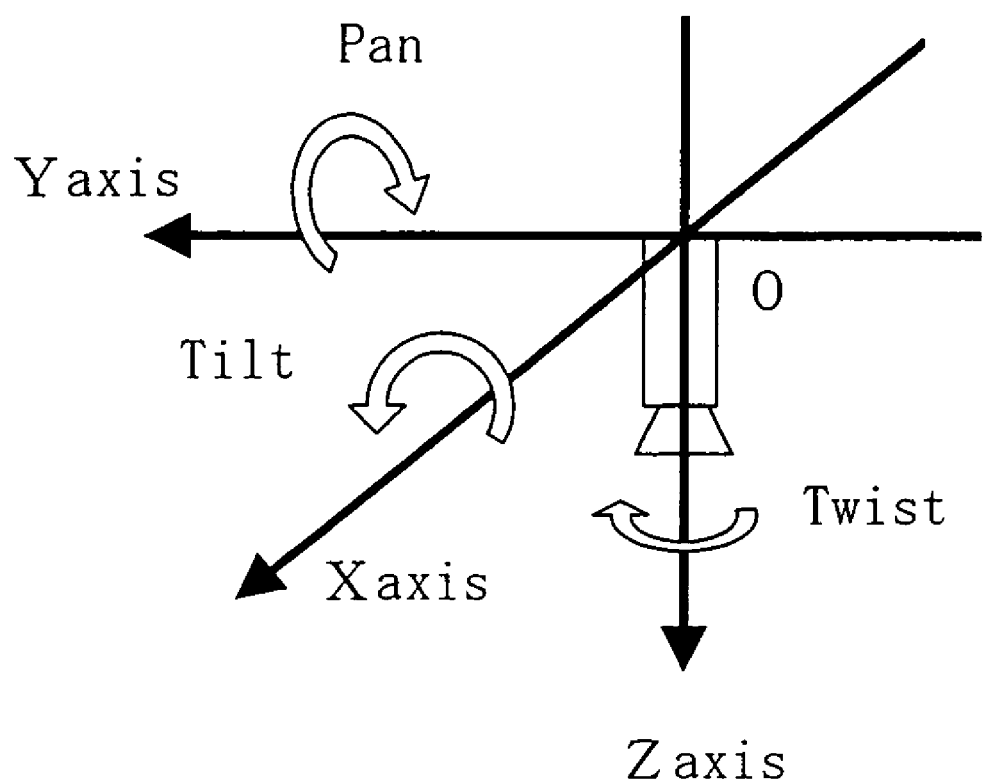
FIG. 5 is a view illustrating the relationship between the tilt, pan and twist representing the camera direction, and the XYZ axes of the coordinates system which defines the space.

First, the camera direction is to be defined. It is a common practice to determine a camera direction by combining the rotations around the X axis, Y axis and Z axis of the space defining coordinates system as shown in FIG. 5. In this specification, the rotations around the X, Y and Z axes are respectively called tilt, pan, and twist. Clockwise rotation of each axis is represented by a positive angle, while counter-clockwise rotation of each axis is represented by a negative angle. The camera direction obtained by conducting the rotating operations shown in FIG. 6(a), FIG. 6(b), FIG. 6(c) in this order, is represented in the form of tilt, pan, and twist.

By these three kinds of angles (tilt, pan, twist), the camera direction in the coordinate system can be uniquely determined. In other words, to optimize each camera direction in a twin-camera, it is required to adjust, in addition to the tilt, two other angles, i.e., the pan and the twist, unlike in the adjustment of a single camera.

Figure 7:
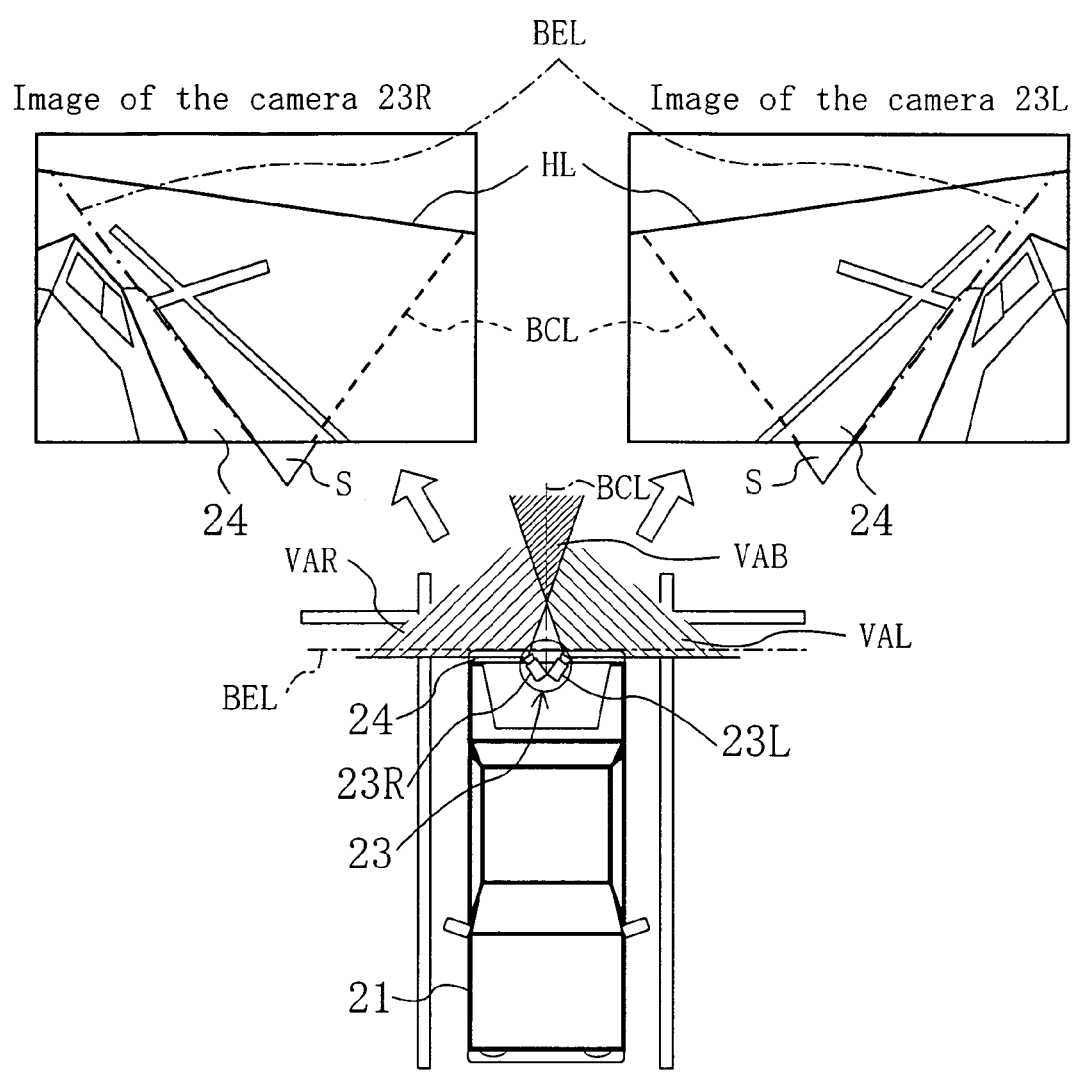
FIG. 7 shows an example of the ranges to be captured and the images captured when the twin-camera shown in FIG. 4 is mounted on the vehicle rear trunk.

FIG. 7 shows an example of the ranges to be captured and the images captured when the twin-camera 23 shown in FIG. 4 is mounted on the vehicle rear trunk.

The conditions for capturing a possibly broad range from the surrounding just behind the vehicle to a place distant therefrom in order to monitor the vehicle in the rear direction, are described in the following three items when qualitatively expressed with the use of the images of the two cameras 23L, 23R:

1. The vehicle center line BCL should be seen in the rear direction as far as possible (up to the horizon if possible).
2. The vehicle rear-end line BEL should be seen in the vehicle transverse directions as far as possible (up to the horizon if possible).
3. The blind zone S behind the vehicle should be minimized.

The item 1 is the condition for assuring the visual field just behind the vehicle. Particularly, when the cameras are disposed in the form of a twin-camera, the center line BCL must overlappingly be captured by each of the two cameras 23L, 23R. Otherwise, when the respective rear images are synthesized, there is formed a blank at the rear center part of the synthesized image, introducing a serious problem in view of safety. It is therefore desired that the center line BCL is seen as far away as possible by each of the two cameras 23L, 23R. The item 2 is the condition for assuring the visual field just beside the vehicle, and the item 3 is the condition for assuring the visual field just below and just behind the vehicle.

Accordingly, when it is possible to calculate the degree at which each of the three conditions above-mentioned is satisfied, the camera direction can efficiently be determined.

Figure 8:
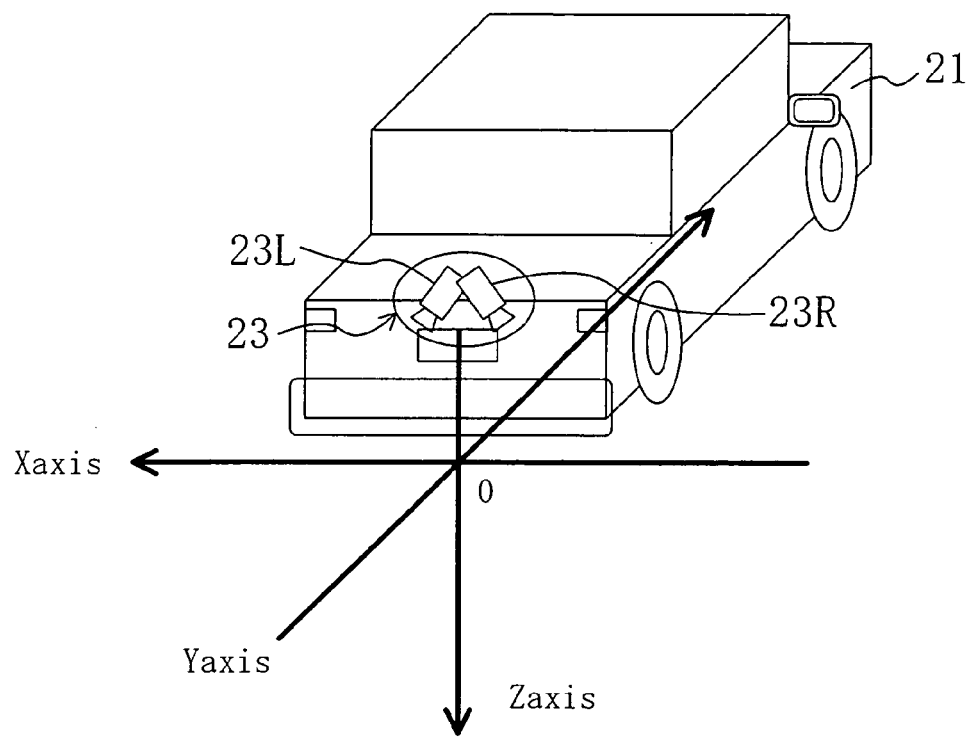
FIG. 8 is a view illustrating a world coordinates system used when mounting the camera.

In this connection, to numerically evaluate the three condition items above-mentioned, a world coordinates system as shown in FIG. 8 is introduced. In this coordinates system, the respective axes are defined as set forth below:

X-axis: the line, as projected on the road surface, of the boundary between the road surface viewed by a camera and the vehicle bumper, on the assumption that the bumper is linear.
Y-axis: the vehicle longitudinal center line on the road surface
Z-axis: the line which is perpendicular to the road surface and which passes through the intersecting point of the X and Y axes.

Figure 9:
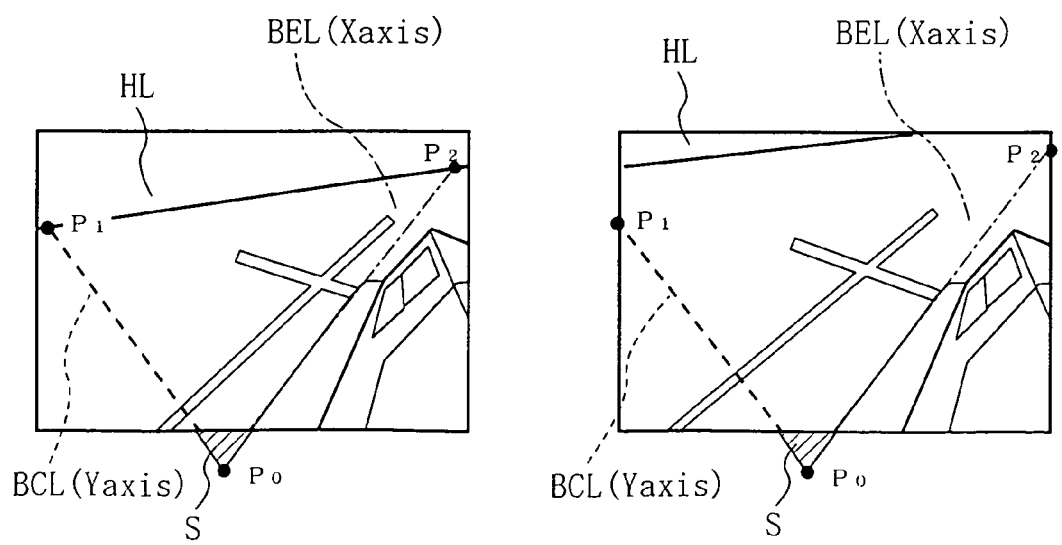
FIG. 9 shows views for illustrating an evaluation value according to the first embodiment of the present invention.

In the coordinates system thus defined, the three items above-mentioned can quantitatively be evaluated with the use of the following indexes:

1. The distance from the origin point to the remotest rear point which can be seen. In FIG. 9, this distance corresponds to the length of a portion P0–P1, as captured by a camera, of the vehicle center line BCL.
2. The distance from the origin point to the remotest transverse point which can be seen. In FIG. 9, this distance corresponds to the length of a portion P0–P2, as captured by a camera, of the vehicle rear-end line BEL.
3. The area of the blind zone S just behind the vehicle.

Accordingly, each camera direction may be determined such that 1. the length P0–P1 is as long as possible, 2. the length P0–P2 is as long as possible, and 3. S is minimized when quantitatively expressing the three condition items mentioned earlier. To evaluate the three items collectively, the following evaluation value is for example introduced:

$$\text{Length P0–P1} \times \text{Length P0–P2} \times 1/S$$

When P1, P2 are positioned on the horizon, the length P0–P1 and the length P0–P2 are infinite. Accordingly, sufficiently large values are previously determined as the upper limits of the length P0–P1 and the length P0–P2.

When mounting the cameras on the vehicle, it is supposed that the camera mounting position has substantially no degree of freedom with the vehicle body design taken into consideration. Accordingly, at a predetermined mounting position, the evaluation value above-mentioned may be evaluated only according to the camera direction (tilt, pan, twist) shown in FIGS. 5 and 6. More specifically, while mutually independently changing the three kinds of angles forming the camera direction, i.e., the tilt, pan, and twist around the optical axis, the evaluation values are calculated, and based on the evaluation values thus calculated, the optimum camera direction (tilt, pan, twist) can be obtained.

Figure 10A:
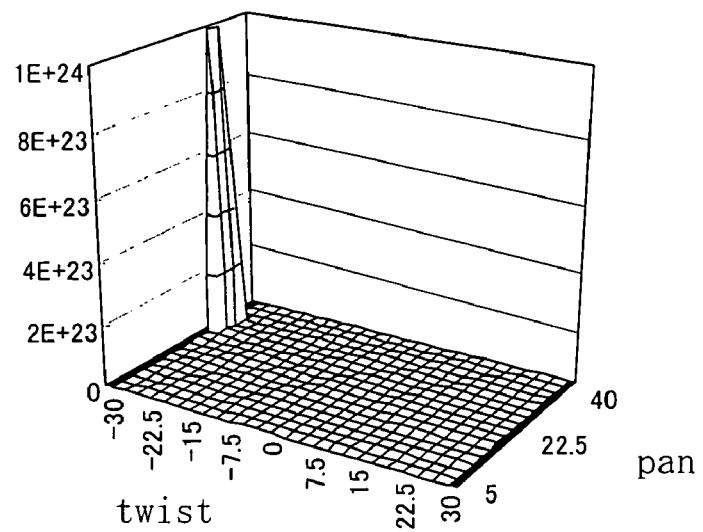
FIG. 10(a) to FIG. 10(c) are views illustrating examples of calculation results of evaluation value.
Figure 10B:
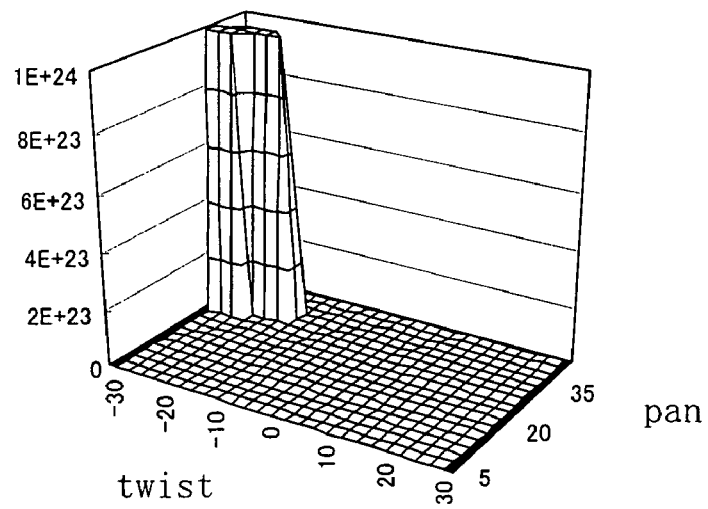
Figure 10C:
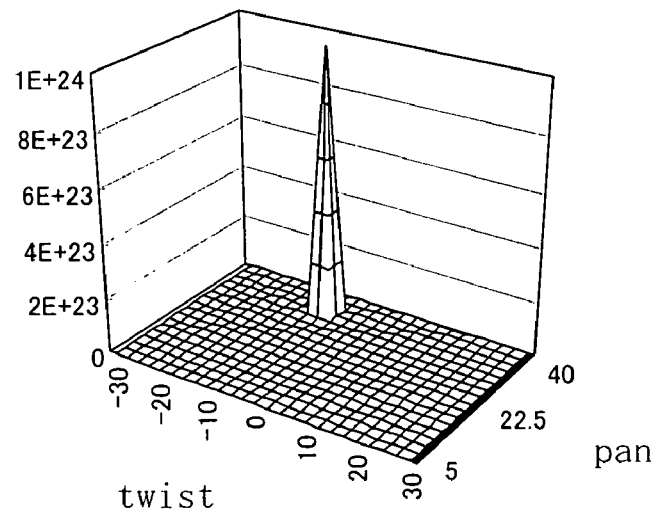

FIG. 10 is an example of the calculation results of evaluation values. In FIG. 10, it is supposed that a camera having a field of view of 110° is mounted, in the world coordinates system in FIG. 7, at a position of the coordinates (3 cm, 20 cm, –1 m), i.e., 3 cm in the positive cm, 20 cm, –1 m), i.e., 3 cm in the positive direction of the X axis from the origin 0, 20 cm in the positive direction of the Y axis and 1 m in the negative direction of the Z axis (1 m in height). FIG. 10 shows the results of the evaluation values calculated with respect to three different tilts while the pan is changed from 5° to 45° and the twist around the camera optical axis is changed from –30° to 30°.

From the test results including the example in FIG. 10, it is understood that a high evaluation value is obtained in the range of the pan from about 25° ~about 45° and in the range of the twist from about –35° ~about –100 According to the tests conducted by the Inventor of this application, it is found that the highest evaluation value is obtained with the tilt of about 40°.

A plane parallel to the optical axes of the two cameras 23L, 23R is defined as a camera installation plane. There is also defined, as an angle of divergence, the angle formed by the optical axes of the two cameras 23L, 23R at the time when the cameras 23L, 23R are projected on this camera installation plane. The angle of divergence corresponds to an angle twice the pan above-mentioned. More specifically, the angle of divergence is preferably in the range not less than 50° and not greater than 90°.

A plane at a right angle to the optical axis of a camera is defined as a reference plane. Then, there is considered the relationship between the u axis of a u-v plane of the camera visual field range at the time when the u-v plane is projected on the reference plane, and the intersecting line of the reference plane and the camera installation plane. When the twist is not adjusted, i.e., when the twist is 0° the projected u axis is parallel to the intersecting line of the reference plane and the camera installation plane.

More specifically, in a twin-camera, the twist around the optical axis of each camera is preferably set such that the u axis projected on the reference plane and the intersecting line of the reference plane and the camera installation plane, are not parallel to each other but intersect each other at a certain angle. Dependent on how to define the u-v coordinates of the camera visual field range, there are instances where the projected u axis intersects, at a right angle, the intersecting line of the reference plane and the camera installation plane, even though the twist is equal to 0°. Accordingly, strictly speaking, the twist around the optical axis of each camera is preferably set such that the u axis projected on the reference plane is not parallel to and does not intersect, at a right angle, the intersecting line of the reference plane and the camera installation plane.

Further, the results above-mentioned show that a high evaluation value is obtained in the range of the twist from –35°–10° for one camera and from 10°~35° for the other camera. This means that the twin-camera is preferably set such that the projected u axis and the intersecting line of the reference plane and the camera installation plane, intersect each other at an angle in the range not less than 10° and not greater than 35°.

According to this embodiment, the camera direction is determined with the use of the evaluation value abovementioned, but this evaluation value may be changed by other standard according to the object. For example, when it is enough to see only the close vicinity just behind the vehicle in the rear direction, the importance of the condition 1 is lowered. In such a case, the weight of "the length P0–P1" in the evaluation value may be reduced.

In the foregoing, the description has been made of how to determine the posture of a camera for monitoring the vehicle in a rear direction. However, the posture of a camera for monitoring the vehicle in a transverse direction or in a front direction, can also be determined by a similar method. More specifically, a straight line indicating the capturing direction may be supposed instead of the vehicle center line BCL, and a straight line extending along the vehicle end may be supposed instead of the vehicle rear-end line BEL. Then, by evaluating data in a manner similar to that in the embodiment above-mentioned, a suitable camera direction may be determined.

In adjustment of the posture of a twin-camera, setting of the twist around the optical axis of each camera is very important. The following will discuss the result of study of the Inventor on the reason of why such setting is important.

FIG. 11($a$) and FIG. 11($b$) are conceptual views illustrating how the visual field range is changed according to the rotation of the camera around its optical axis. FIG. 11($a$) shows the case where the twist is 0° (no rotation around the optical axis), while FIG. 11($b$) shows the case where the twist is 33.20. In FIG. 11, one camera 23L of the twin-camera is shown. The camera 23L has a field of view of 111° and is positioned at the coordinates (3 cm, 10 cm, –1 m) with the tilt set to 40° and the pan set to 30°.

Now comparison is made between FIG. 11($a$) and FIG. 11($b$). In FIG. 11($a$), the camera can see only 11 m in the transverse direction at the vehicle rear end (vehicle rear-end line BEL) and only 4.4 m just in the rear direction at the vehicle longitudinal center (vehicle center line BCL). On the other hand, in FIG. 11($b$), the camera can see a place which reaches the horizon HL in each of the transverse direction at the vehicle rear end and the rear direction at the vehicle longitudinal center. It is understood that the visual field can considerably be enlarged only by changing the twist even though other conditions than the twist are the same. It is considered that such change is caused due to the fact that the camera visual field range is square. The difference in visual field range results in a greater difference when a virtual visual point image is synthesized.

FIG. 12($a$) and FIG. 12($b$) are views illustrating the virtual visual point images obtained at the time when the twist is 0° as shown in FIG. 11($a$), and FIG. 13($a$) and FIG. 13($b$) are views illustrating the virtual visual point images obtained at the time when the twist is 33.2° as shown in FIG. 11($b$). As shown in FIG. 12, only the range of 4.4 m from the vehicle just behind the same, is captured by the camera when its twist is 0°. Accordingly, a person standing at a position, in the vehicle rear direction, remote by more than 4.4 m from the vehicle, does not appear at all on the virtual visual point image. On the contrary, when the twist is 33.2°, the rear scene just behind the vehicle is reflected on the camera up to the horizon HL as shown in FIG. 13. Accordingly, a person standing at a position of about 5 m from the vehicle in the rear direction, can securely be reflected on the virtual visual point image.

As discussed in the foregoing, the range of the visual field is considerably changed by adjusting the twist around the optical axis of the camera. This considerably changes the range of the vehicle surrounding to be displayed as a virtual visual point image. More specifically, to properly set the twist around the optical axis of each camera, is very important in a twin-camera for determining the performance of the monitoring system.

In a twin-camera, two cameras forming a pair are disposed in close vicinity to each other. The distance between the cameras is preferably as small as possible.

Figure 14A:
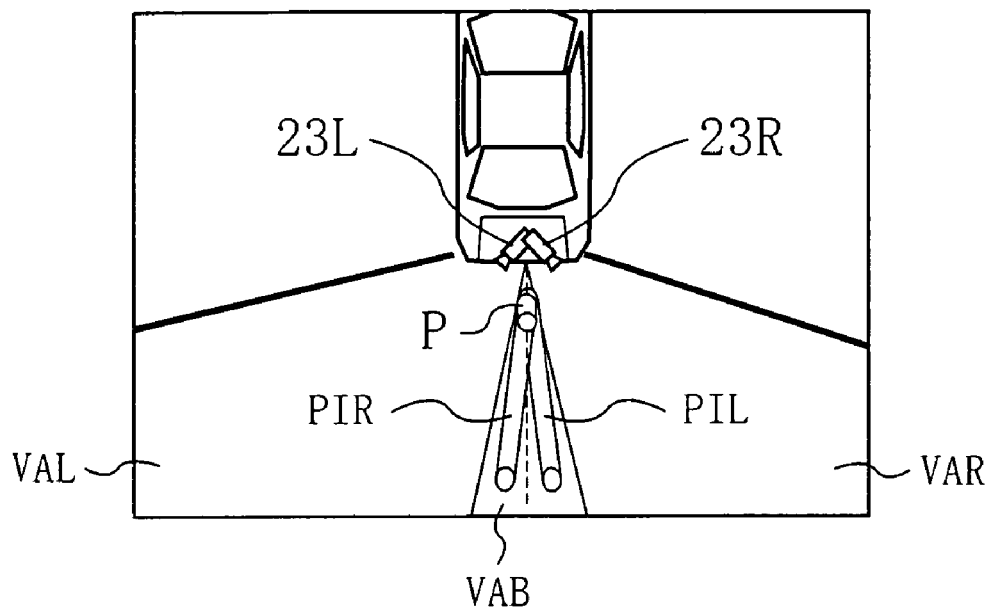
FIG. 14(b) is a view illustrating a virtual visual point image, as viewed from above, which is obtained by synthesizing the images captured by the twin-camera.
Figure 14B:
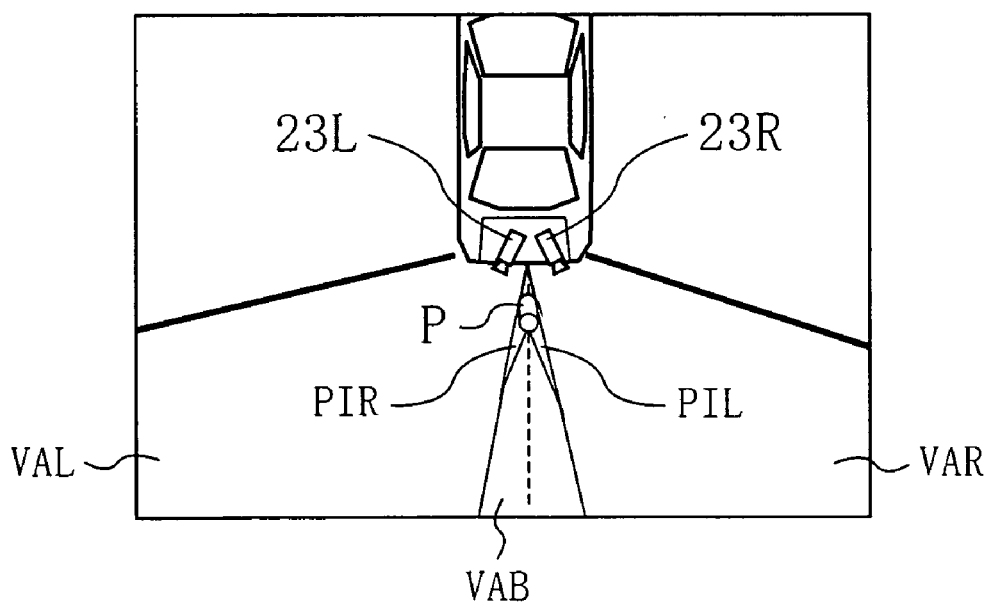

FIG. 14(a) and FIG. 14(b) are views illustrating virtual visual point images, as viewed from above, which are obtained by synthesizing the images captured by the twin-camera. FIG. 14(a) shows the case where the two cameras 23L, 23R are disposed in close vicinity to each other, while FIG. 14(b) shows the case where the two cameras 23L, 23R are disposed with a small distance provided therebetween. Shown in FIG. 14 are an area VAL where only the image of the camera 23L is used, an area VAR where only the image of the camera 23R is used, an area VAB where the images of the two cameras 23L, 23R are synthesized, a pole P just behind the vehicle, an image PIL which is the image of the pole P synthesized from the image of the camera 23L, and an image PIR which is the image of the pole P synthesized from the image of the camera 23R.

FIG. 14(a) and FIG. 14(b) are different from each other in that the pole P is included or not included in the area VAB in the synthesized image. More specifically, in FIG. 14(a), the pole images PIL, PIR respectively captured by the two cameras 23L, 23R are included in the area VAB. On the other hand, in FIG. 14(b), the two cameras 23L, 23R are disposed as slightly separated from each other and therefore, the pole images PIL, PIR protrude from the area VAB in the synthesized image. As a result, only the base portion of the pole P is shown in the synthesized image, causing the image at the boundary to be unnatural.

From the study of the Inventor, it has been found that, when partial images are synthesized at the time the distance between the image forming points of the camera lenses is 20 cm or more, a shear in image at the boundary is increased, readily causing the image at the boundary to be unnatural. More specifically, when disposing a twin-camera, it is preferable to dispose the two cameras such that the image forming points thereof are not separated from each other by 20 cm or more. Further, the two cameras forming a twin-camera are preferably packaged in a unitary structure.

This embodiment can be applied not only to a vehicle monitoring system, but also to a monitoring system for other application. More specifically, the technical concept of this embodiment can readily be applied to any system as far as the system has a twin-camera composed of cameras forming a pair.

SECOND EMBODIMENT

According to a second embodiment, it is supposed that the display mode of the vehicle outside display apparatus 10 shown in FIG. 1 is set to a rear wide visual field scene display mode.

Figure 15A:
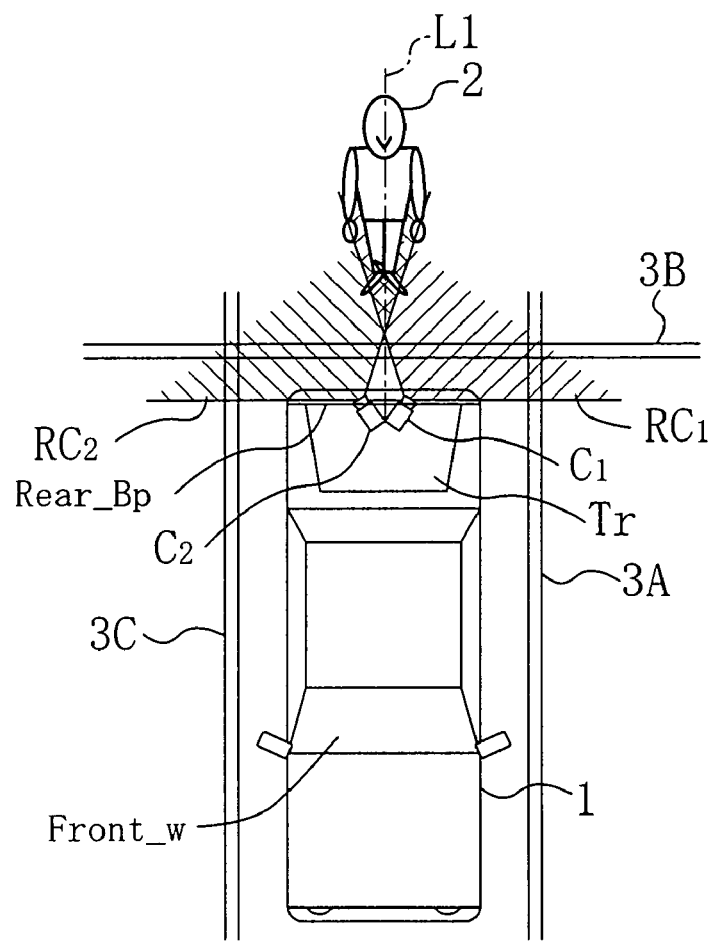
Figure 15B:
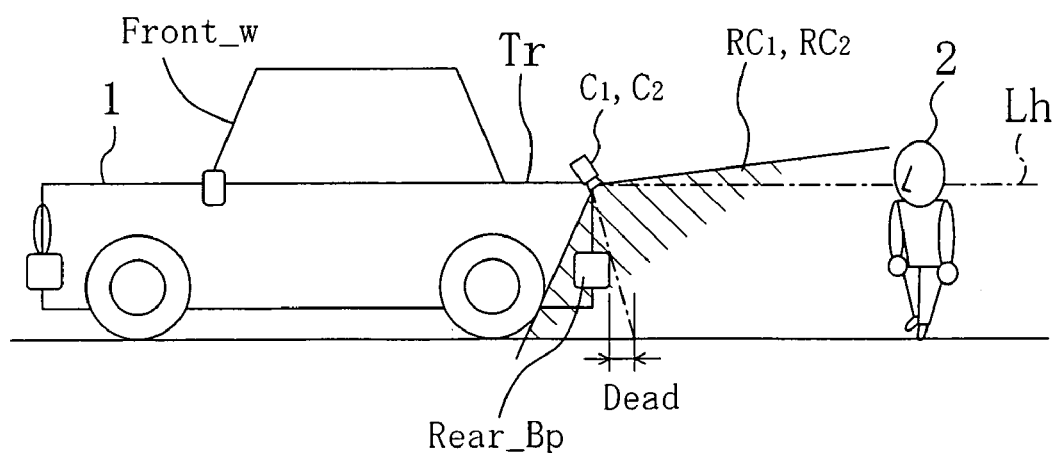

FIG. 15(a) and FIG. 15(b) are views of a vehicle 1 and its surrounding. That is, FIG. 15(a) is a plan view and FIG. 15(b) is a side view. Shown in FIG. 15 are a front window Front_w of the vehicle 1, a rear bumper Rear_Bp, a trunk Tr and white lines 3A, 3B, 3C drawn on the ground surface. A pedestrian 2 (infant) stands behind the vehicle 1.

As shown in FIG. 15, two cameras C1, C2 forming a pair are disposed in close vicinity to each other at the rear part of the vehicle 1, the two cameras C1, C2 being turned slightly obliquely downward and rearwardly outward. There are also shown a range to be captured RC1 by the camera C1 and a range to be captured RC2 by the camera C2. A straight line L1 divides, into two equal portions, the overlapping portions of the ranges to be captured RC1, RC2 of the cameras C1, C2, and a straight line Lh is horizontally drawn from the mounting position of the cameras C1, C2.

As understood from FIG. 15(b), the cameras C1, C2 are disposed such that each of the ranges to be captured by the cameras C1, C2 includes both a portion of the rear bumper Rear_Bp and a portion of the horizon which would be seen when it is supposed that the vehicle is present on a level ground where no obstacle exists.

FIG. 16(a) shows the image TP1 captured by the camera C1 and FIG. 16(b) shows the image TP2 captured by the camera C2. There are also shown clipping ranges RGN_01, RGN_02. As shown in FIG. 16, provision is made such that each of the clipping ranges RGN_01, RGN_02 includes the rear bumper Rear Bp.

Figure 17:
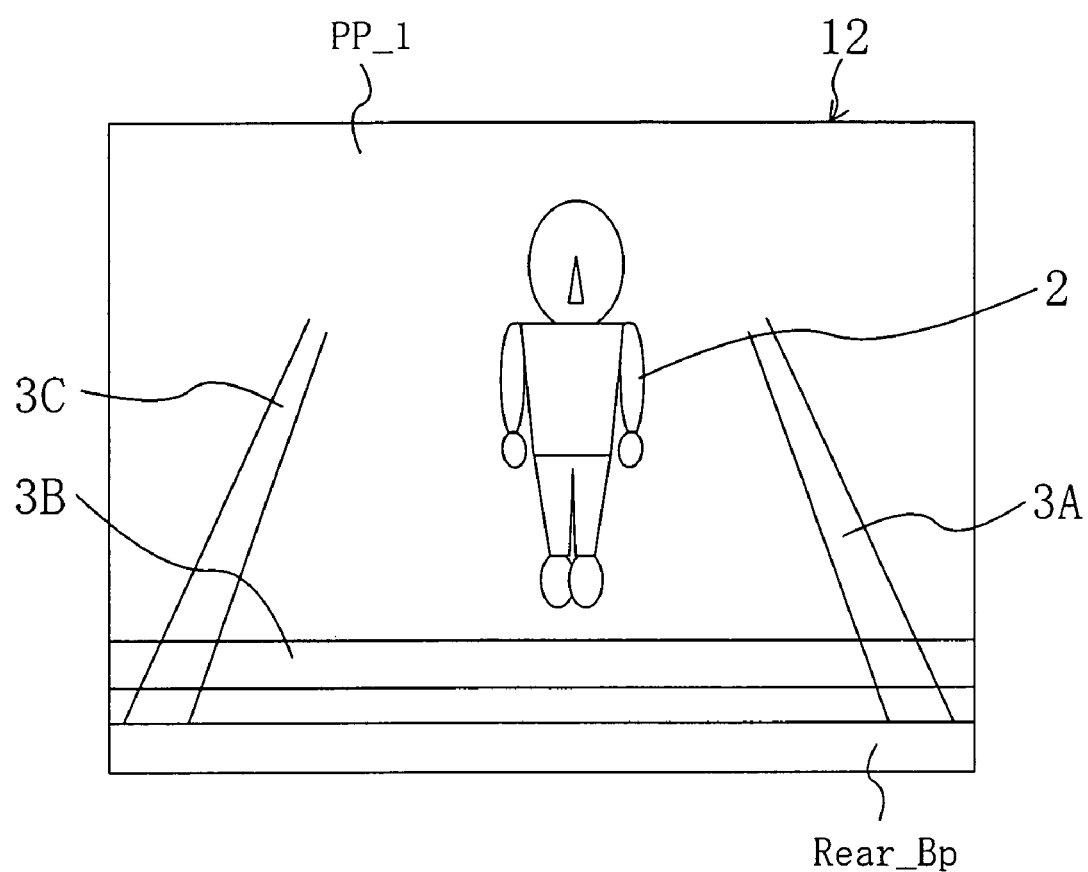
FIG. 17 is a virtual visual point image formed with the use of the captured images in FIG. 16.
Figure 18A:
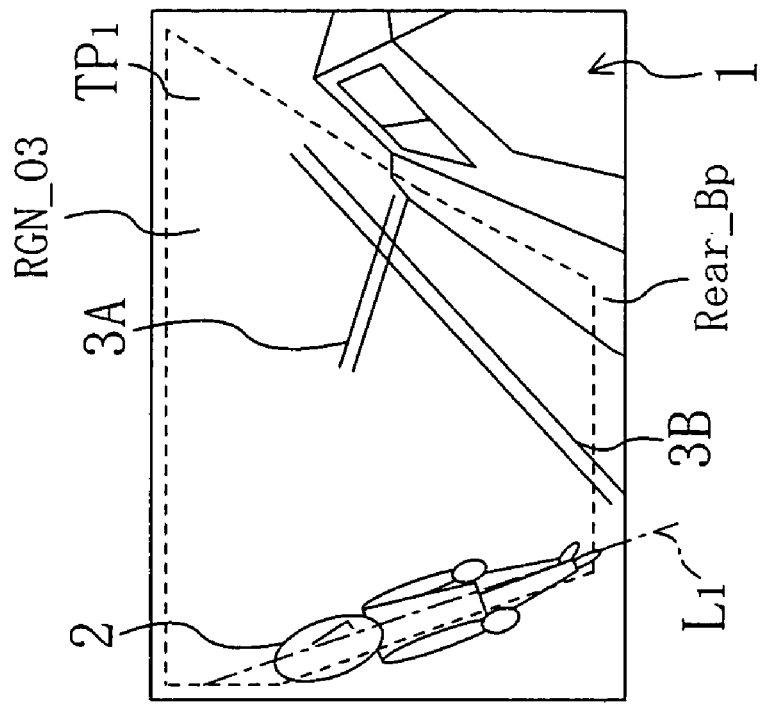
FIG. 18(a) and FIG. 18(b) are views for illustrating the third embodiment of the present invention, and show the images captured by the respective cameras shown in FIG. 15.
Figure 18B:
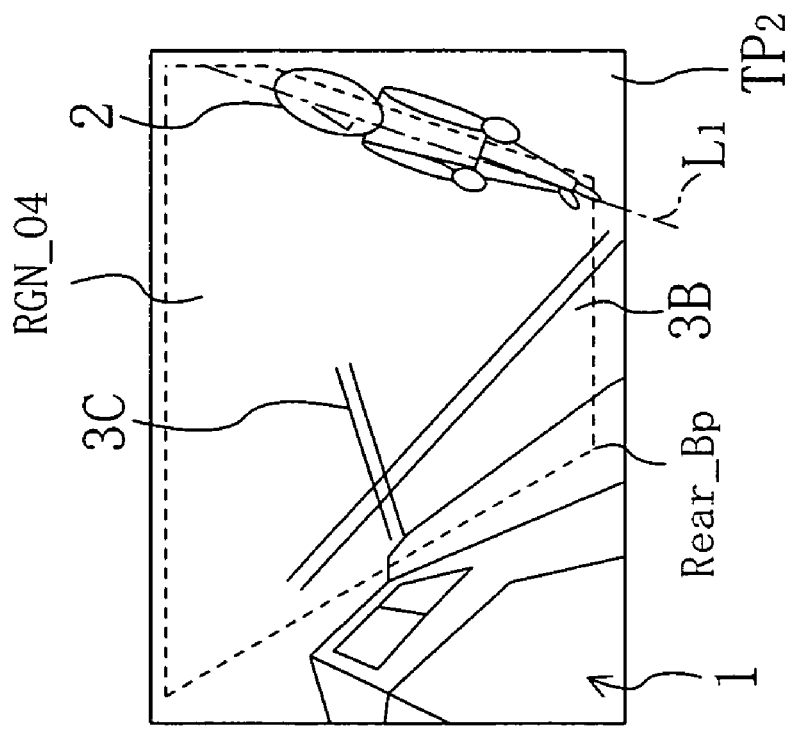

FIG. 17 shows a virtual visual point image PP_1 displayed on the display 12. In the image in FIG. 17, the virtual visual point is set such that the rear visual field is spread in a wide area in the vicinity of the trunk Tr of the vehicle 1.

According to the second embodiment, the image processing device 11 executes simultaneously a processing of preparing partial images by clipping the captured images TP1, TP2 while referring to the conversion table TBL1 (table for a rear scene display), a processing of deforming the partial images to a virtual visual point image PP_1, and a processing of synthesizing the partial images (including a boundary processing). Accordingly, the virtual visual point image PP_1 as shown in FIG. 17 is displayed on the display 12.

According to the second embodiment, the virtual visual point image PP_1 shows, on a single screen, a rear scene in a wide visual field, thus improving the visibility in the rear direction of the vehicle 1. In normal travelling or high-speed travelling, the virtual visual point may be set at the front of or slightly above the front window Front_w. In such a case, the rear scene of the vehicle viewed from a visual point different from the room mirror and the side mirrors, can be displayed in a wide range, facilitating to make sure of succeeding vehicles and the like.

THIRD EMBODIMENT

According to a third embodiment, it is supposed that the display mode of the vehicle outside display apparatus 10 shown in FIG. 1 is set to a rear surrounding ground display mode. In this embodiment, the two cameras C1, C2 shown in the second embodiment are used as they are. The display mode of the vehicle outside display apparatus 10 can be switched from the rear wide visual field scene display mode to the rear surrounding ground display mode, and vice versa. Such switching can be made manually or automatically.

According to the third embodiment, the cameras C1, C2 are set such that each of the ranges to be captured by the cameras C1, C2 includes an area occupied at the time when the vehicle 1 is retreated at an optional wheel angle by a predetermined distance. Generally, this predetermined distance is preferably set to at least N1/N2 of the vehicle length (N1 is an integer not less than 2, N2 is an integer not less than 3, and N1<N2). From the result of repeated tests conducted by the Inventor, it is found that when the predetermined distance is set to at least 3 m or ⅔ of the vehicle length, the driver can comfortably execute a backing operation for parallel parking, putting into a garage, tandem parking or the like.

Likewise FIG. 16(a) and FIG. 16(b), FIG. 18(a) and FIG. 18(b) show the images TP1, TP2 captured by cameras C1, C2. There are also shown clipping ranges RGN_03, RGN_04 according to the third embodiment.

Figure 19:
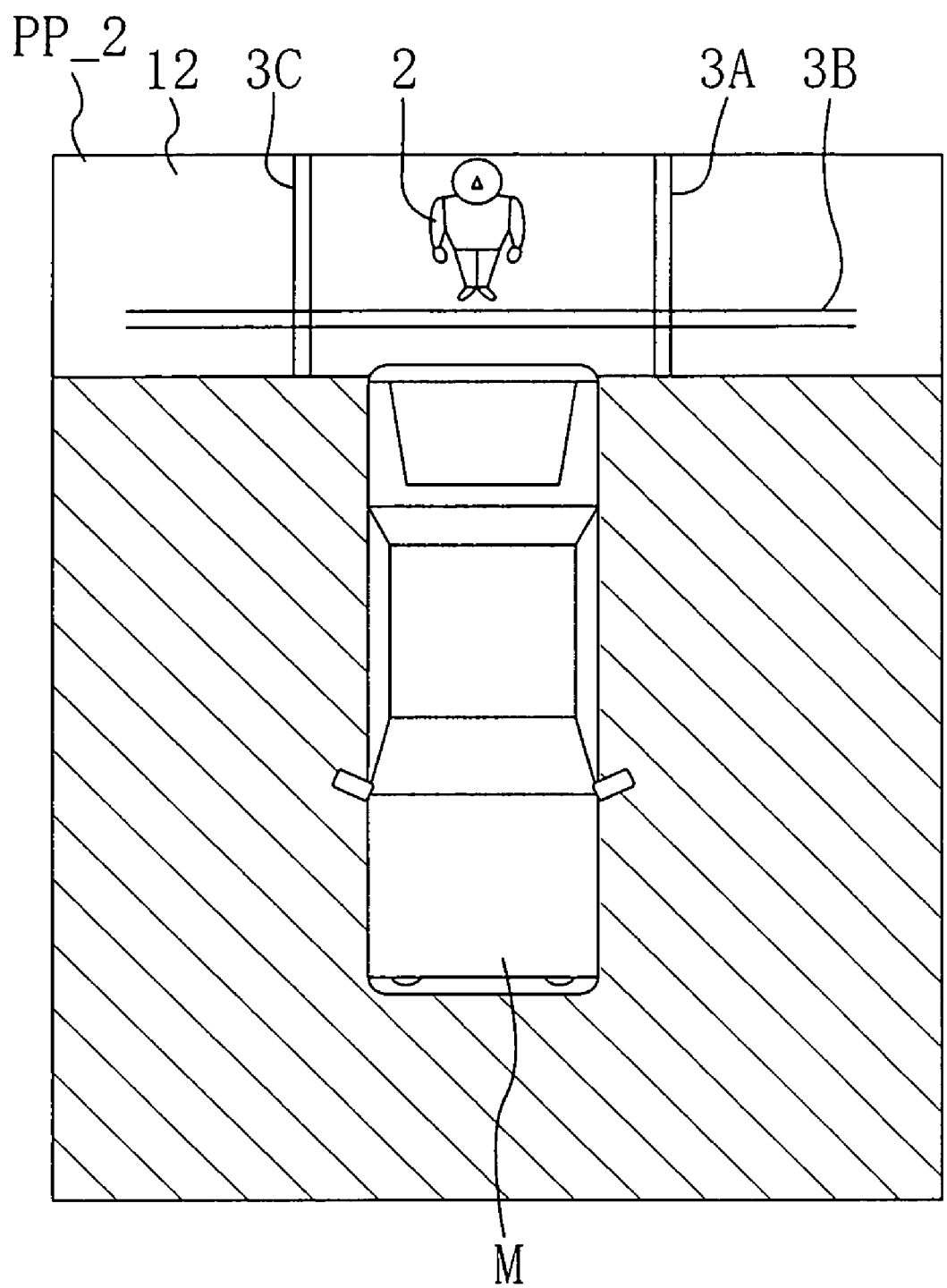
FIG. 19 is a virtual visual point image formed with the use of the captured images in FIG. 18.

FIG. 19 shows a virtual visual point image PP_2 displayed on the display 12. According to the third embodiment, the image processing device 11 executes simultaneously a processing of preparing partial images by clipping the captured images TP1, TP2 while referring to the conversion table TBL2 (table for the rear surrounding ground display), a processing of deforming the partial images to the virtual visual point image PP_2, and a processing of synthesizing the partial images (including a boundary processing). Accordingly, the virtual visual point image PP_2 as shown in FIG. 19 is displayed on the display 12. In FIG. 19, a vehicle figure M is displayed at the center of the display 12.

Figure 20A:
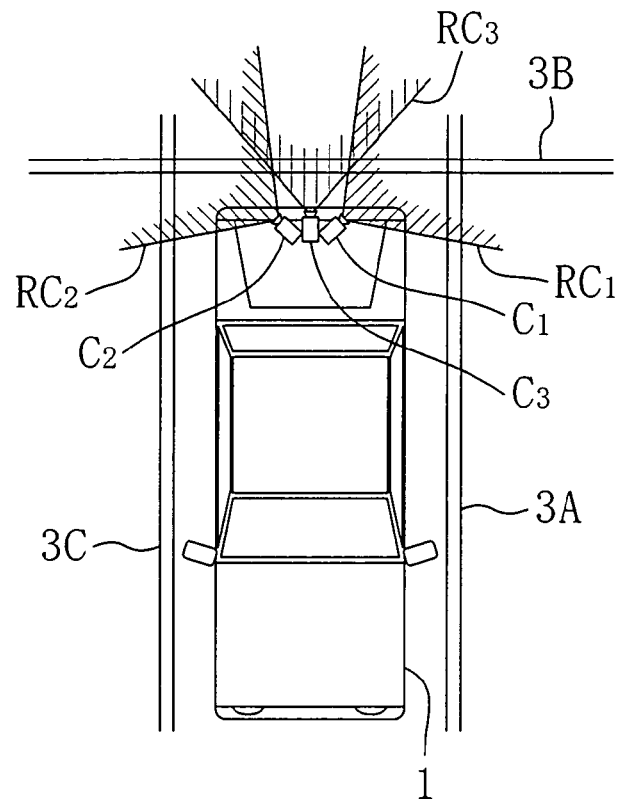
FIG. 20(a) and FIG. 20(b) are views illustrating the third embodiment of the present invention in which three cameras are mounted.
Figure 20B:
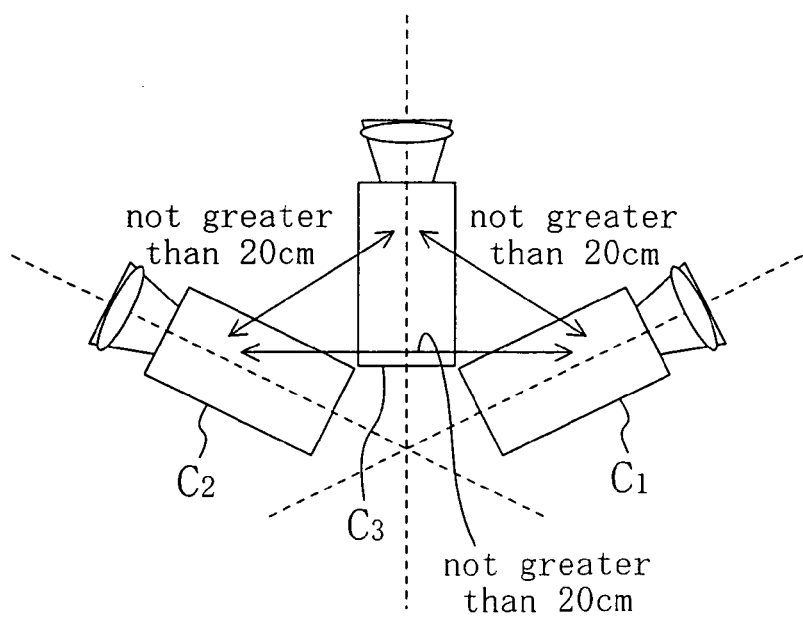

When the ranges to be captured by the two cameras C1, C2 are too narrow to sufficiently display, on the screen, the ground around the rear of the vehicle 1, another camera C3 may be added such that the total three cameras C1, C2, C3 are disposed at the rear of the vehicle 1 as shown in FIG. 20(a). Shown in FIG. 20(a) are the ranges to be captured RC1, RC2, RC3 of the cameras C1, C2, C3. By the addition of a camera, the range of the surrounding ground to be displayed can be enlarged. In such a case, too, it is preferable to dispose the cameras C1, C2, C3 such that each of the gaps among the image forming points thereof is not greater than 20 cm as shown in FIG. 20(b).

According to the third embodiment, the virtual visual point is present at an upper part of the vehicle. Therefore, the display 12 displays the virtual visual point image PP_2 in which the vehicle 1 and the surrounding ground behind the vehicle 1 are viewed from above. Accordingly, the driver can accurately grasp the distance between the vehicle 1 and an obstacle behind the same.

FOURTH EMBODIMENT

According to a fourth embodiment, it is supposed that the display mode of the vehicle outside display apparatus 10 shown in FIG. 1 is set to a lateral-side surrounding ground display mode.

Figure 21:
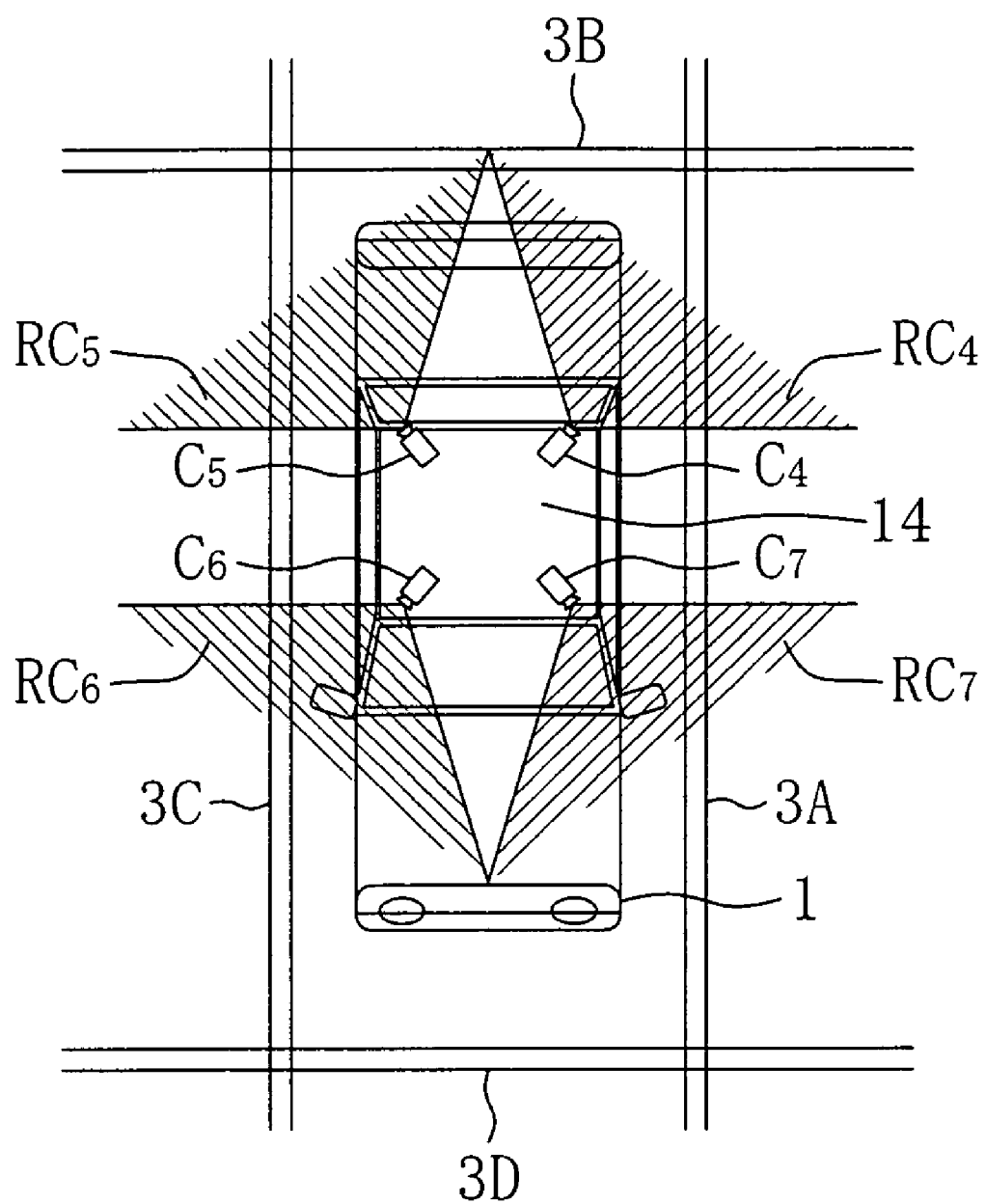
FIG. 21 is a plan view of a vehicle and its surrounding according to a fourth embodiment of the present invention.

FIG. 21 is a plan view of a vehicle 1 and its surrounding. As shown in FIG. 21, four cameras C4~C7 are disposed on the roof 14 of the vehicle 1. The cameras C4~C7 are disposed at positions within 20 cm from the end edges of the roof 14 at the rear left position, the rear right position, the front right position and the front left position, respectively. The cameras C4, C5 are turned obliquely backward, while the cameras C6, C7 are turned obliquely forward. Shown in FIG. 21 are ranges RC4~RC7 to be captured by the cameras C4~C7 respectively, and white lines 3A, 3B, 3C, 3D drawn on the ground.

FIG. 22(a) to FIG. 22(d) respectively show the images TP4~TP7 respectively captured by the cameras C4~C7. There are also shown clipping ranges RGN_05, RGN_06, RGN_07, RGN_08 of the captured images TP4~TP7 of the cameras C4~C7. As shown in FIG. 22, each of the captured images TP4~TP7 includes any of the four corners of the vehicle 1.

Figure 22B:
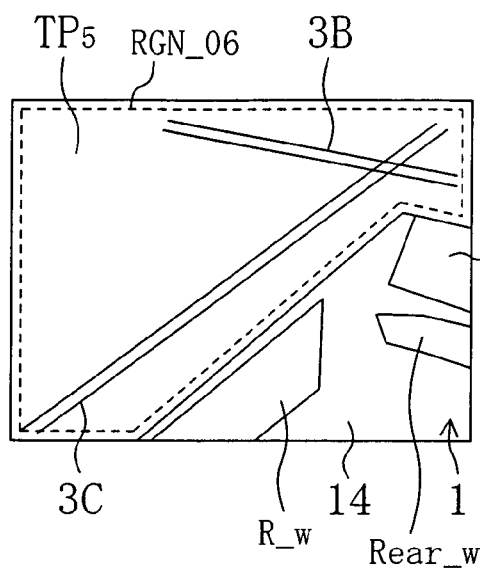
FIG. 22(a) to FIG. 22(d) are views illustrating the images captured by the respective cameras shown in FIG. 21.
Figure 22A:
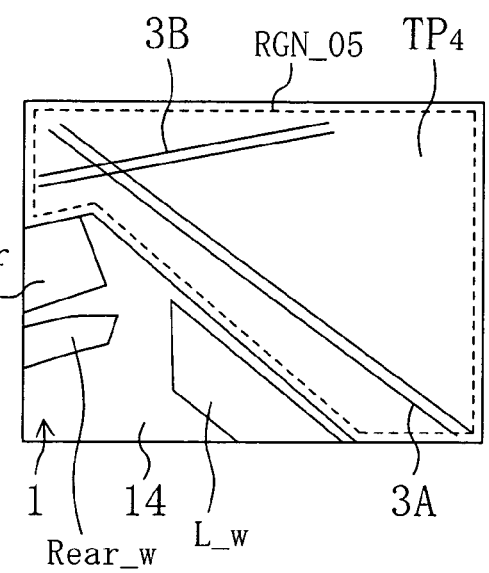
Figure 22C:
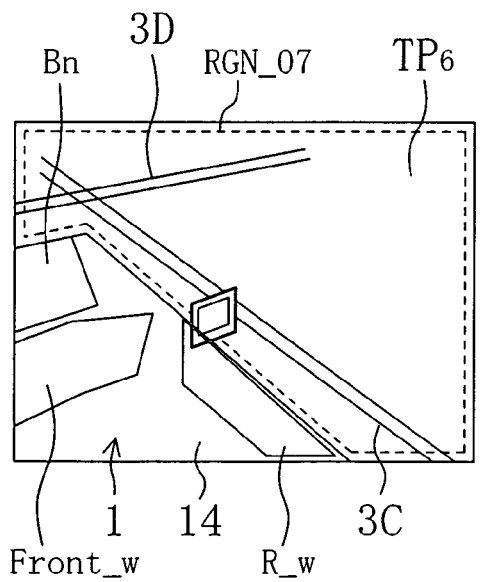
Figure 22D:
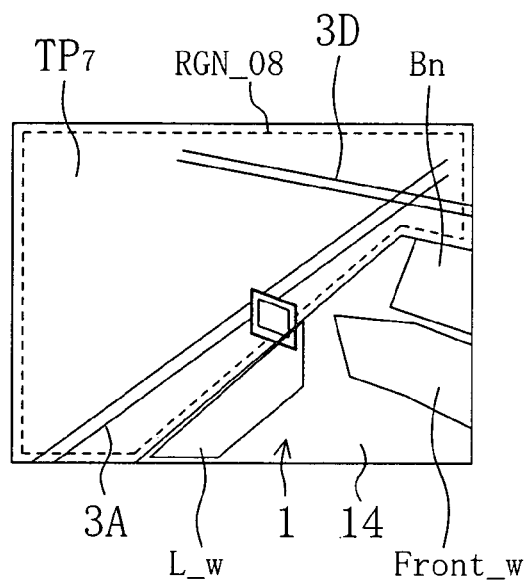

The captured image TP4 shown in FIG. 22(a) includes the trunk Tr, a rear window Rear_w, and a left side window L_w. The captured image TP5 shown in FIG. 22(b) includes the trunk Tr, a rear window Rear_w, and a right side window R_w. The captured image TP6 shown in FIG. 22(c) includes the bonnet Bn, a front window Front_w, and a right side window R_w. The captured image TP7 shown in FIG. 22(d) includes the bonnet Bn, a front window Front_w, and a left side window L_w.

According to the fourth embodiment, the cameras C4~C7 are disposed at a high position of the vehicle 1, i.e., on the roof 14. This reduces cubic distortion of other vehicle, a pedestrian, a structure and the like around the vehicle 1 which are displayed on the display 12. Further, the installation of the cameras C4~C7 in the vicinity of the end edges of the roof 14, reduces the blind zones generated by the body of the vehicle 1, enabling the surrounding ground to be displayed on the display 12 in a wider range. Wherein, the cameras C4~C7 may be disposed at a roof pillar.

Figure 23:
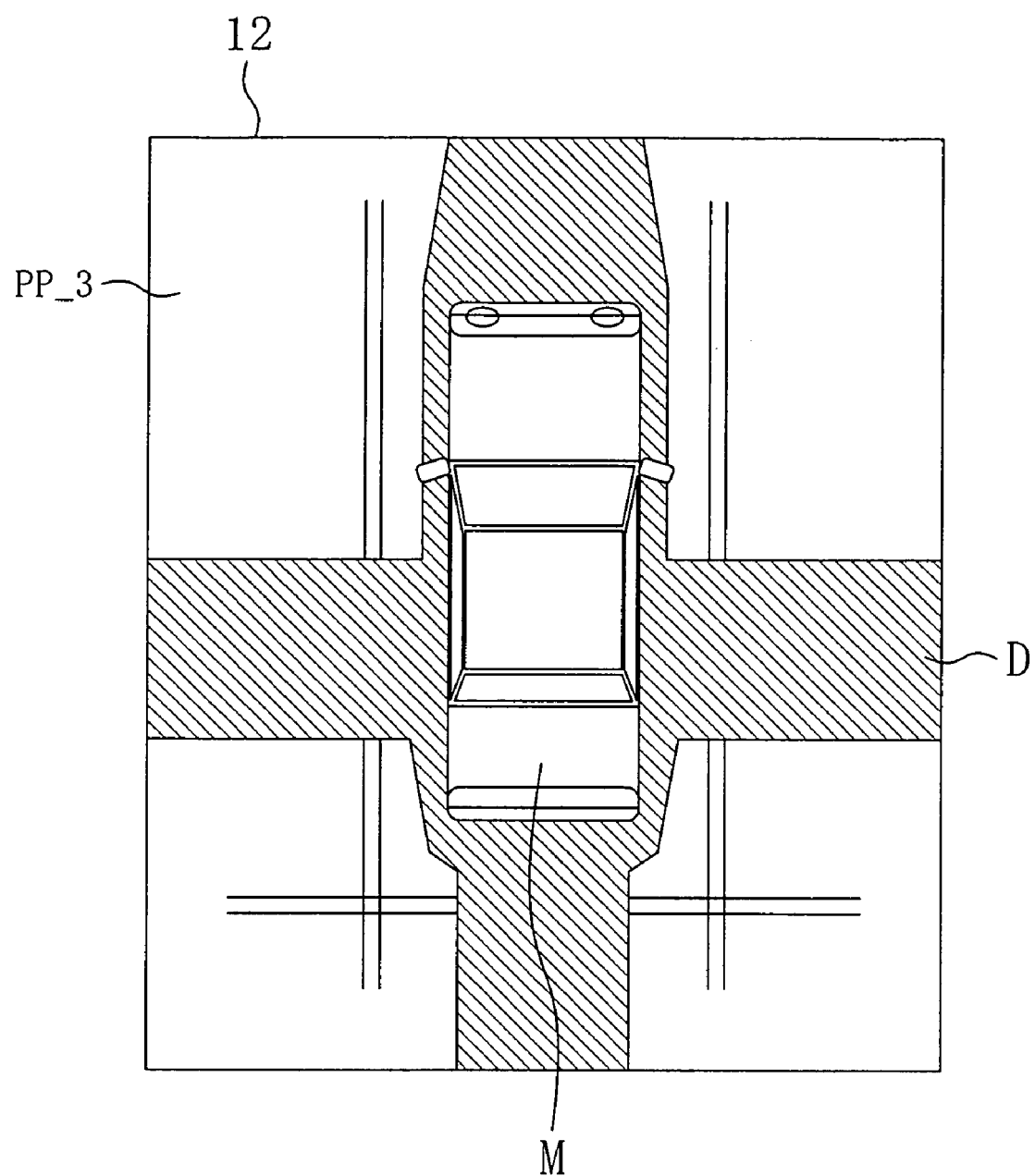
FIG. 23 is a virtual visual point image formed with the use of the captured images in FIG. 22.

According to the fourth embodiment, too, the image processing device 11 shown in FIG. 1 executes simultaneously a processing of preparing partial images by clipping the captured images TP4~TP7 while referring to the conversion table TBL3 (table for a lateral-side surrounding ground display), a processing of deforming the partial images to a virtual visual point image, and a processing of synthesizing the partial images (including a boundary processing). Accordingly, a virtual visual point image PP_3 as shown in FIG. 23 is displayed on the display 12. In FIG. 23, a vehicle figure M is displayed at the center of the display 12.

In FIG. 23, blind zones D are formed at both lateral sides of the vehicle 1. The blind zone D at the left side can be eliminated by extending the field of views of the forwardly turned camera C7 and the rearwardly turned camera C4 such that the visual fields thereof overlap each other. The blind zone D at the right side can be eliminated by extending the field of views of the forwardly turned camera C6 and the rearwardly turned camera C5 such that the visual fields thereof overlap each other. Further, the blind zones can also be eliminated by combining this embodiment with a fifth embodiment to be discussed later.

FIFTH EMBODIMENT

According to a fifth embodiment, the capturing means is disposed in the vicinity of the centers of the lateral sides of the vehicle such that the blind zone areas for example shown in the fourth embodiment are included in the range to be captured. According to the fifth embodiment, the display mode of the vehicle outside display apparatus 10 shown in FIG. 1 is set to a lateral-side surrounding ground display assisting mode.

Figure 24:
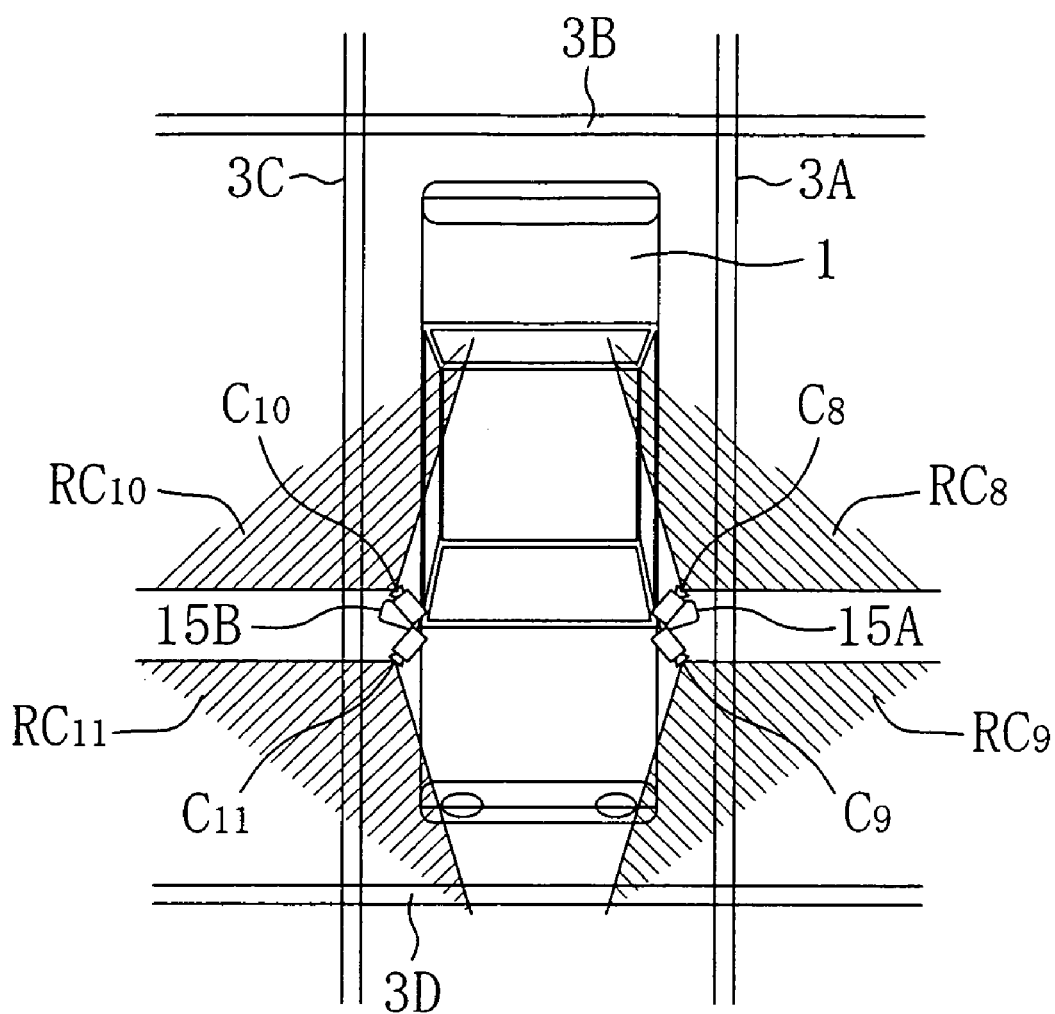
FIG. 24 is a plan view of a vehicle and its surrounding according to a fifth embodiment of the present invention.

FIG. 24 is a plan view illustrating a vehicle 1 and its surrounding. As shown in FIG. 24, cameras C8, C9 are disposed at the non-movable part of a left door mirror 15A of the vehicle 1, and cameras C10, C11 are disposed at the non-movable part of a right door mirror 15B of the vehicle 1. Also shown in FIG. 24 are ranges RC8, RC9, RC10, RC11 to be captured by the cameras C8~C11, respectively, and white lines 3A, 3B, 3C, 3D drawn on the ground surface.

FIG. 25(a) to FIG. 25(d) respectively show the images TP8~TP11 captured by the cameras C8~C11. There are also shown clipping ranges RGN_09, RGN_10, RGN_11, RGN_12 of the captured images TP8~TP11.

Figure 25A:
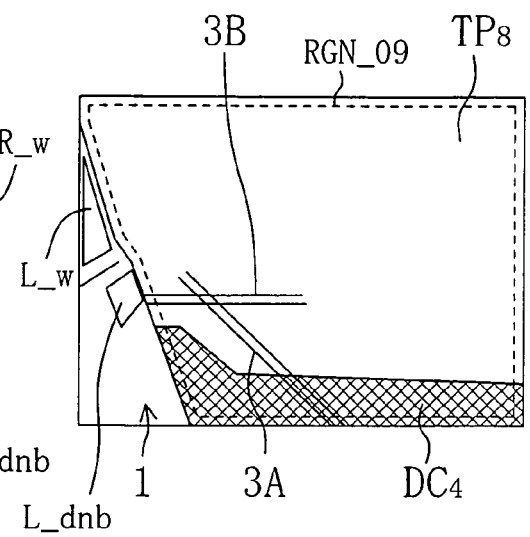
FIG. 25(a) to FIG. 25(d) are views illustrating the images captured by the respective cameras shown in FIG. 24.
Figure 25C:
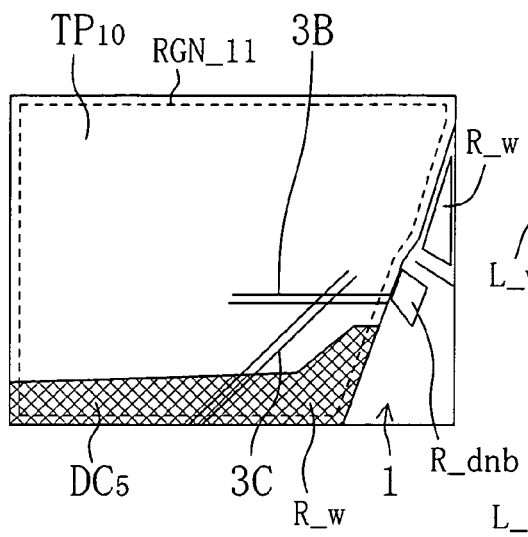
Figure 25B:
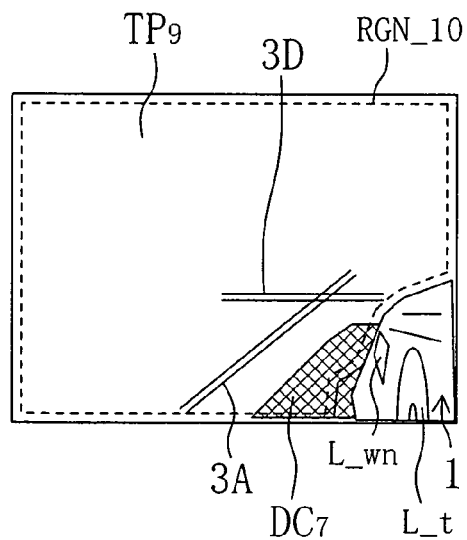
Figure 25D:
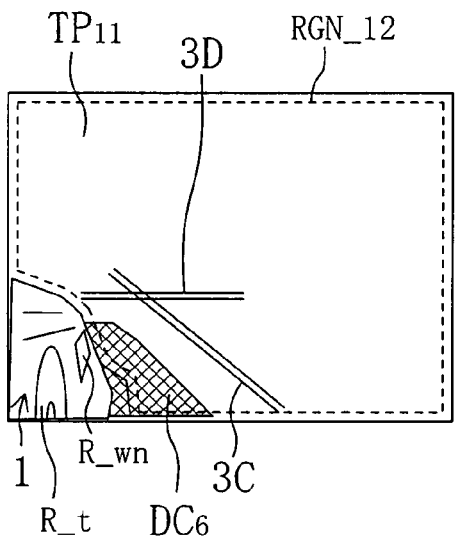

The captured image TP8 shown in FIG. 25(a) includes the left side window L_w and the left side door knob L_dnb. The captured image TP9 shown in FIG. 25(b) includes the left front winker L_wn and the left front tire L_t. The captured image TP10 shown in FIG. 25(c) includes the right side window R_w and the right side door knob R_dnb. The captured image TP11 shown in FIG. 25(d) includes the right front winker R_wn and the right front tire R_t. In FIG.

25(*a*)~FIG. 25(*d*), blind zones DC4, DC7, DC5, DC6 of the cameras C4, C7, C5, C6 shown in the third embodiment, are shown by hatched lines.

According to the fifth embodiment, the cameras C8~C11 are disposed in the vicinity of the door mirrors 15A, 15B at the vehicle lateral sides, enabling the blind zones to be considerably reduced. In this connection, by combining the fifth embodiment with the fourth embodiment above-mentioned, the places which should be seen by the driver to make sure of the safety, are substantially securely included in any of the captured images TP4~TP11 of the cameras C4~C11. As a result, there can be provided a vehicle outside display apparatus excellent in safety. For example, out of the captured images TP4~TP7 of the cameras C4~C7 shown in the fourth embodiment and the captured images TP8~TP11 of the cameras C8~C11 shown in the fifth embodiment, the partial images in the predetermined ranges are clipped to form a virtual visual point image covering the entire range of the vehicle surrounding.

Figure 26:
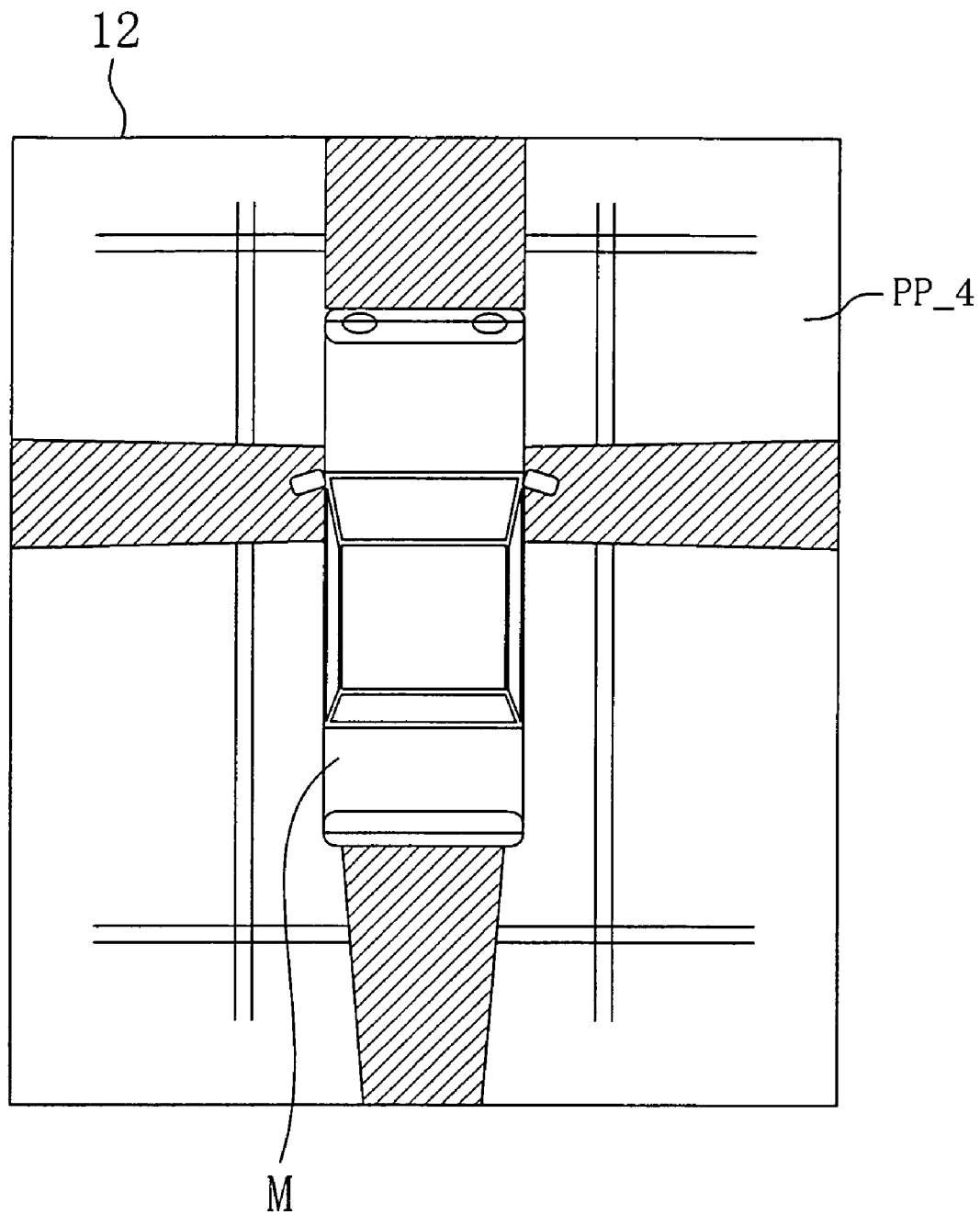
FIG. 26 is a virtual visual point image formed from the captured images in FIG. 25.

According to the fifth embodiment, too, the image processing device 11 shown in FIG. 1 executes simultaneously a processing of preparing partial images by clipping the captured images TP8~TP11, a processing of deforming the partial images to a virtual visual point image and a processing of synthesizing the partial images (including a boundary processing). Accordingly, a virtual visual point image PP_4 as shown in FIG. 26 is displayed on the display 12. In FIG. 26, a vehicle figure M is displayed at the center of the display 12.

According to the fifth embodiment, there is prepared a single virtual visual point. Accordingly, there are prepared, on the same virtual visual point, both the images obtained from the cameras C8, C9 shown at the left side of the vehicle figure M and the images obtained from the cameras C10, C11 shown at the right side of the vehicle figure M. However, a plurality of virtual visual points may be set, and the image at the left side of the vehicle figure M may be prepared based on a virtual visual point set immediately above the cameras C8, C9, while the image at the right side of the vehicle figure M may be prepared based on a virtual visual point set immediately above the cameras C10, C11.

The cameras C8~C11 may be disposed, instead of at the non-movable parts of the door mirrors, at the lateral sides of the vehicle, the window visors, the door knob mounting portions, or the like. In such an arrangement, too, there are produced effects similar to those of the fifth embodiment.

SIXTH EMBODIMENT

Figure 27A:
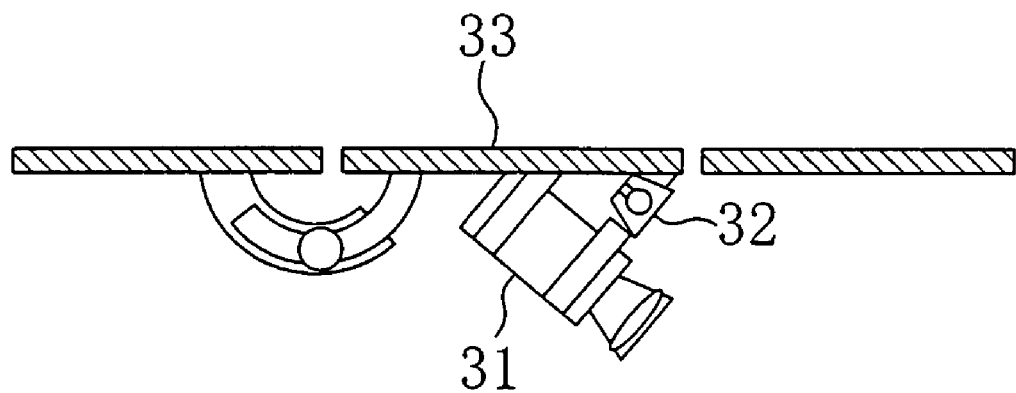
FIG. 27(a) and FIG. 27(b) show an example of how a camera is mounted according to a sixth embodiment of the present invention, in which a retractable mode is adopted.
Figure 27B:
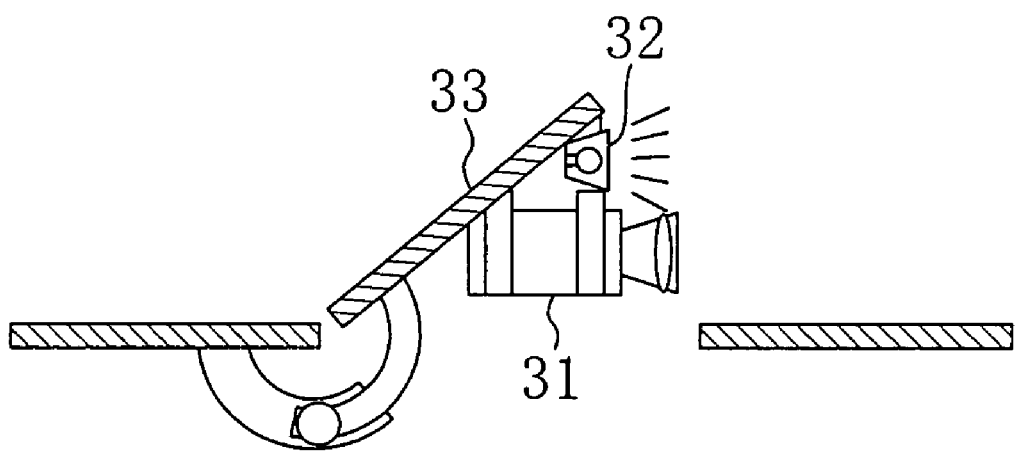
Figure 28A:
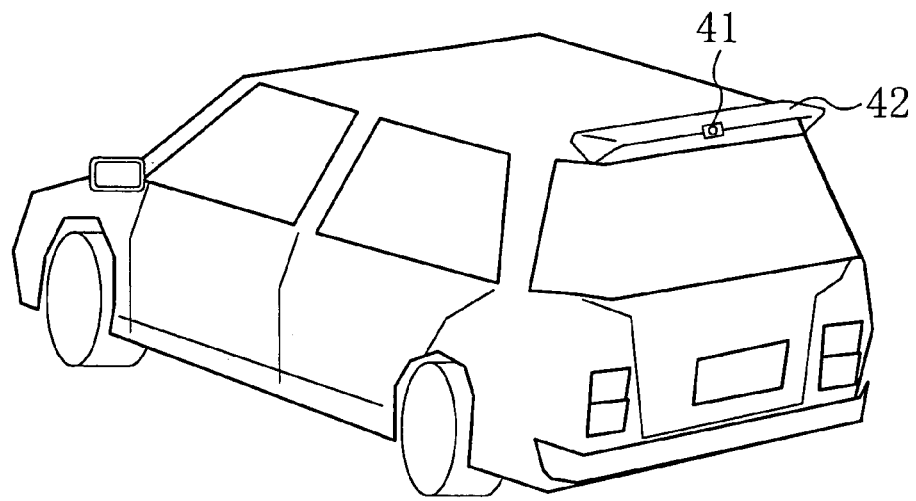
FIG. 28(a) to FIG. 28(e) show another examples of how the camera is mounted according to the sixth embodiment of the present invention, in which an opening/closing mechanism is adopted.
Figure 28B:
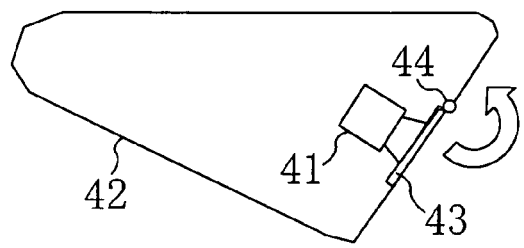
Figure 28C:
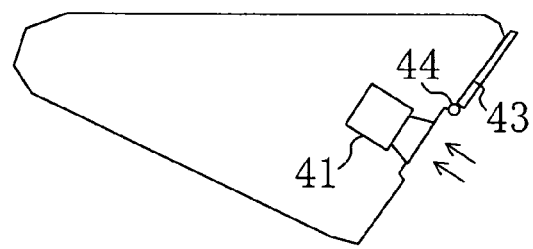
Figure 28D:
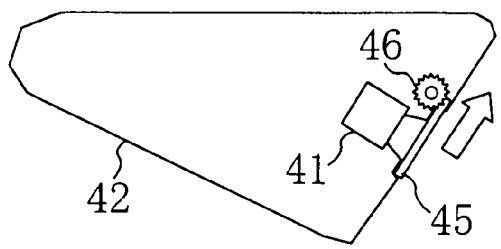
Figure 28E:
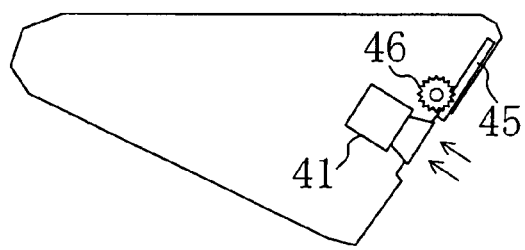

FIG. 27(*a*) and FIG. 27(*b*) show an example of how the camera is mounted according to a sixth embodiment. Shown in FIG. 27(*a*) and FIG. 27(*b*) are a camera 31, a halogen lamp 32 serving as illumination means, and an openable member 33. The camera 31 is retractably disposed, and the openable member 33 forms a part of the vehicle body when closed.

When not used, the camera 31 is in a housed state as shown in FIG. 27(*a*). On the other hand, for using the camera 31, the openable member 33 is opened, causing the camera 31 to be ejected to the outside of the vehicle as shown in FIG. 27(*b*).

More specifically, this sixth embodiment adopts the retractable mode to enable the camera to be ejected and housed. Accordingly, with the camera housed, the vehicle is neither lowered in aerodynamic characteristics nor injured in the beauty of vehicle design. On the other hand, the camera can be protected against dust and water drops.

Instead of the retractable mode, the camera may be installed together with an openable member such as a shutter or the like disposed at the front in the capturing direction. In such a case, the camera is disposed as always housed in the vehicle body. The openable member may be adjusted such that the member is opened for using the camera and closed when the camera is not used.

FIG. 28(*a*) to FIG. 28(*e*) are views illustrating openable cameras 41 disposed at rear wings 42. FIG. 28(*a*) shows the appearance of the whole body including the vehicle, FIG. 28(*b*) and FIG. 28(*c*) show the arrangement for protecting the camera by a door-type openable member, and FIG. 28(*d*) and FIG. 28(*e*) show the arrangement for protecting the camera by a slide-type openable member. In the door type, the opening and closing state of a shutter (protective lid) 43 is controlled by a lid opening/closing motor 44 in the same manner as a door is opened and closed (FIG. 28(*b*) shows the closed state, while FIG. 28(*c*) shows the opening state). In the slide type, the opening and closing state of a shutter (protective lid) 45 is controlled by a lid opening/closing motor 46 which slides the shutter 45 (FIG. 28(*d*) shows the closed state, while FIG. 28(*e*) shows the opening state).

For conveniences' sake, the arrangement using a single camera is illustrated. However, it is a matter of course that a similar opening/closing mechanism can be applied to a twin-camera, too. Here, two types of shutter opening/closing mechanisms have been discussed, but the opening/closing operation may of course be achieved by other mechanism.

The use of such an opening/closing mechanism produces, in addition to the effect produced by the adoption of a retractable mode, an effect of restraining the camera from being positionally shifted because of no change in camera physical position. In such a case, it is required to dispose the camera at a position which assures the desired visual field. For example, when there is disposed a camera for monitoring the place immediate below and just behind the vehicle, it is preferable to dispose the camera, as turned downward, inside of the rear wing 42 as shown in FIG. 28(*a*). This position is not particularly noticeable. Further, the rear wing 42 is already projecting rearward. Accordingly, without the special need to eject the camera for assuring the visual field, the desired visual field can readily be assured. However, when introducing such an opening/closing mechanism, it is required to design the configurations of the opening/closing mechanism and the shutter such that in the opening state, the camera visual field is not obstructed by the whole or a part of the shutter as opened.

Further, the camera may be disposed as housed in the vehicle body, and there may be disposed a transparent member such as a glass sheet at the front in the capturing direction.

In FIG. 27, the camera 31 is disposed as corresponding to the halogen lamp 32 for irradiating light to the range to be captured by this camera 31. The camera 31 and the halogen lamp 32 are made in a unitary structure such that both the camera 31 and the halogen lamp 32 are ejected and housed at the same time. It is a matter of course that the illumination means may be disposed independently from the camera such that the light is irradiated to the range to be captured by the camera.

As the capturing means, there may be used a camera having a capturing function of the infrared light detection type. In such a case, the illumination means may be an infrared light source. For example, red light emitting diodes may be attached to the tail lamp portions, or the tail lamps themselves may be red light emitting diodes. Such an arrangement can improve the visibility of a person, a structure and the like present in the range to be captured even though the surrounding of the vehicle is dark.

Provision may be made such that the control of ejecting and housing the camera 31 is automatically made according to the vehicle gear setting, the travelling speed or the like.

For example, when the camera 31 of the sixth embodiment is used as a camera disposed at the rear end of the vehicle as shown in the third embodiment, the camera 31 may be so arranged, for example, as to be ejected when the vehicle engine is turned on and the gear is set in the backing mode, and as to be housed when the gear is set in other mode than the backing mode.

When the camera 31 of the sixth embodiment is used as a camera disposed as shown in the second embodiment, the camera 31 may be arranged in the following manner. For example, the camera 31 may be ejected when the vehicle under normal travelling continuously travels at a predetermined speed (e.g., 50 Km/h) or more for a predetermined period of time or more, and the camera 31 may be housed when the vehicle continuously travels at a predetermined speed (e.g., 30 Km/h) or less for a predetermined period of time or more. It is a matter of course that the camera 31 may be ejected and housed manually.

According to the present invention, examples of the vehicle include an ordinary motor vehicle, a light motor car, an automobile truck, a bus and the like. Further, examples of the vehicle may also include a special vehicle such as a crane vehicle, an excavator and the like as far as the technical concept of the present invention can be applied thereto.

In the description above-mentioned, the monitoring system according to the present invention is applied to a vehicle, but may similarly be applied to other moving body than a vehicle, such as an air plane, a ship and the like. Further, the camera may be installed on other object than a moving body, such as a shop, a house, a show-room and the like.

Further, the positions and number of a plurality of cameras are not limited to those shown in the embodiments above-mentioned.

What is claimed is:

1. A monitoring system comprising a twin-camera composed of first and second cameras forming a pair,
    said first and second cameras being disposed such that at least portions of the ranges to be captured thereby overlap each other, and that the optical axes thereof form a predetermined angle of divergence when said optical axes are projected on a camera installation plane parallel to said optical axes,
    the twist around the optical axis of at least one of said first and second cameras being set such that when an u-v plane of the visual field range of said at least one camera is projected on a reference plane at a right angle to the optical axis of said at least one camera, the u axis is not parallel to and does not intersect, at a right angle, the intersecting line of said reference plane and said camera installation plane.

2. A monitoring system according to claim 1, wherein said twin-camera is mounted on a vehicle for capturing both the surrounding of said vehicle and a place distant therefrom.

3. A monitoring system according to claim 2, wherein said twin-camera is disposed such that said angle of divergence is not less than 50° and not greater than 90°, and that said twist is not less than 10° and not greater than 35° on the assumption that said twist is 0° when said u axis on said reference plane is parallel to said intersecting line of said reference plane and said camera installation plane.

4. A monitoring system according to claim 1, wherein each of said first and second cameras has a visual field range in the form of a square.

5. A method of adjusting a twin-camera composed of a pair of cameras mounted on a vehicle for capturing both the surrounding of said vehicle and a place distant therefrom,
    said camera adjusting method being characterized in that the tilt, pan and twist around the optical axis of each of said pair of cameras, are adjusted using, as indexes, the length of a portion, as captured by each camera, of the straight line indicating the capturing direction, the length of a portion, as captured by each camera, of a straight line extending along the vehicle end, and the area of the blind zone in the capturing direction.

6. A vehicle monitoring system according to claim 1, further comprising:
    at least one of said first and second cameras for capturing the surrounding of a vehicle; and
    an image processing unit for generating, from the images captured by said cameras, a synthesized image viewed from a virtual view point.

7. A vehicle monitoring system according to claim 1, further comprising:
    at least one of said first and second cameras being disposed as corresponding to illumination means for irradiating light to the range to be captured by said at least one camera.

8. A vehicle monitoring system comprising:
    one or a plurality of cameras for capturing the surrounding of a vehicle; and
    an image processing unit for generating, from the images captured by said one or plurality of cameras, a synthesized image viewed from a virtual view point,
    at least one of said one or plurality of cameras being so retractably mounted on said vehicle as to be ejected when said camera is used, and as to be housed when said camera is not used;
    wherein said retractable camera is arranged such that its ejecting and housing is controlled according to at least one of the gear setting or travelling speed of said vehicle.

9. A vehicle monitoring system according to claim 1, further comprising:
    at least one of said first and second cameras being mounted on said vehicle together with an openable member disposed at the front in the capturing direction of said at least one camera,
    said openable member being so controlled as to be opened when said camera is used, and as to be closed when said camera is not used.

10. A vehicle monitoring system according to claim 1, further comprising:
    at least one of said first and second cameras being mounted on said vehicle at a non-movable part of its door mirror, its window visor or its door knob mounting part.

* * * * *